United States Patent
Kanada et al.

(10) Patent No.: US 7,242,555 B2
(45) Date of Patent: Jul. 10, 2007

(54) INERTIAL LATCHING MECHANISM FOR DISK DRIVE ACTUATOR

(75) Inventors: Naoaki Kanada, Kanagawa (JP); Kazuyoshi Yoshida, Kanagawa (JP); Keiichiroh Yoshida, Kanagawa (JP); Toshihiko Yuhhi, Tokyo (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 680 days.

(21) Appl. No.: 10/721,621

(22) Filed: Nov. 25, 2003

(65) Prior Publication Data

US 2004/0145831 A1 Jul. 29, 2004

(30) Foreign Application Priority Data

Nov. 26, 2002 (JP) ............... 2002-342538

(51) Int. Cl.
*G11B 21/22* (2006.01)
(52) U.S. Cl. ..................................... 360/256
(58) Field of Classification Search ................ 360/256, 360/256.4
See application file for complete search history.

(56) References Cited

U.S. PATENT DOCUMENTS

| 6,028,746 | A | * | 2/2000 | Matsumura | 360/256.4 |
| 6,507,461 | B1 | * | 1/2003 | Kimura et al. | 360/256.4 |
| 6,680,822 | B1 | * | 1/2004 | Lin et al. | 360/256.4 |
| 6,710,980 | B1 | * | 3/2004 | Hauert et al. | 360/256.4 |

* cited by examiner

*Primary Examiner*—Hoa T. Nguyen
*Assistant Examiner*—Mark Blouin
(74) *Attorney, Agent, or Firm*—Bracewell & Giuliani LLP

(57) ABSTRACT

The invention prevents the deterioration of the read/write performance of a hard disk drive due to the interference between an inertial latching mechanism and an actuator when a head slider holding a magnetic head is located at a read/write position. A latching arm 22 provided with a projection 23 and included in an inertial latching mechanism 20, and a part 161 of a coil holding arm 16a included in an actuator are formed in shapes such that the latching arm 22 provided with the projection 23 does not interfere with the coil holding arm 16a having the part 161 when a head slider mounted on the actuator is located at a read/write position on a magnetic disk.

15 Claims, 20 Drawing Sheets

(a)
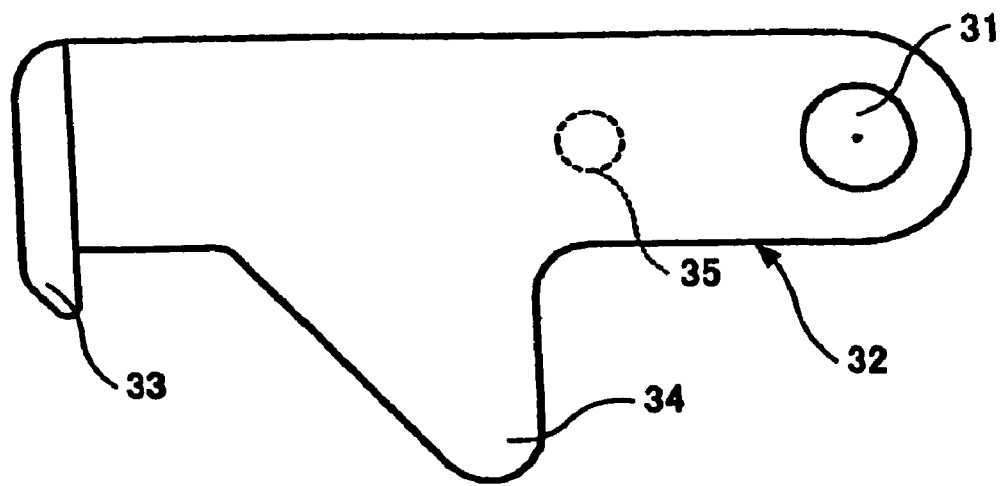
(b)
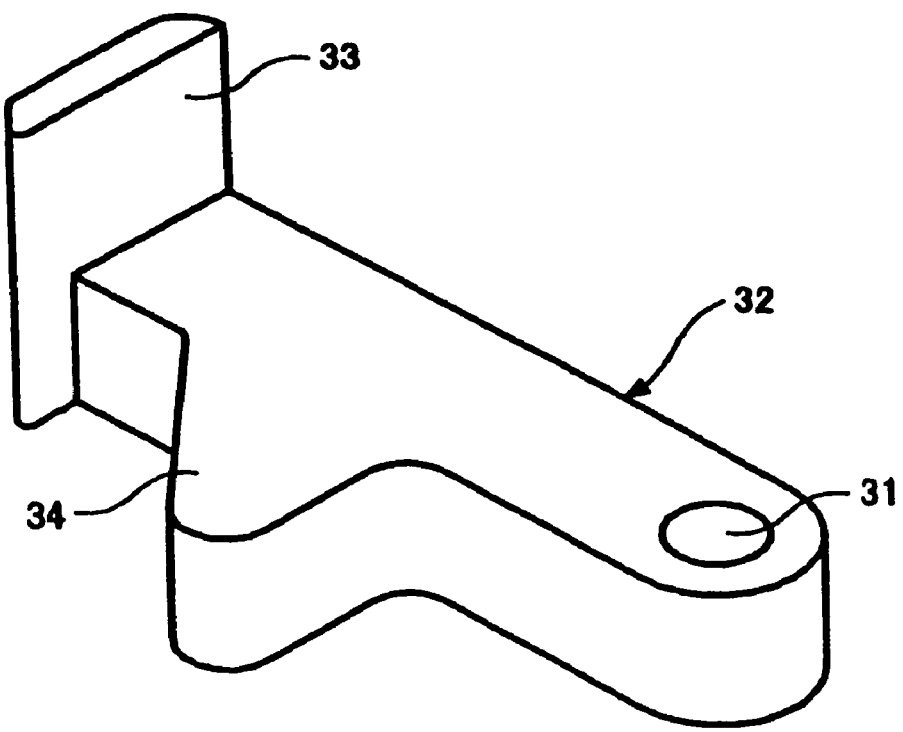
FIG. 5

INERTIAL LATCHING MECHANISM FOR DISK DRIVE ACTUATOR

RELATED PATENT APPLICATION

This application claims priority to Japanese Patent Application No. JP2002-342538 (Hitachi Global Storage Technologies Docket No. JP920020202US1), filed on Nov. 26, 2002, and entitled "Disk Drive."

BACKGROUND OF THE INVENTION

1. Technical Field

The present invention relates to a disk drive and, more particularly, to a disk drive provided with a latching mechanism for latching an actuator.

2. Description of the Related Art

A recent hard disk drive employs a head slider moving mechanism for moving a head slider supporting a magnetic head to prevent the head slider from sticking to the surface of a magnetic disk and to improve the reliability thereof in withstanding shocks applied thereto. The head slider moving mechanism holds an actuator on a part called a ramp disposed near the circumference of the magnetic disk to keep the head slider apart from the surface of the magnetic disk while the hard disk drive is not in operation.

FIG. 16 shows, by way of example, a hard disk drive 1 provided with a head slider moving mechanism. The hard disk drive 1 shown in FIG. 16 has a disk pack (case) 3 including a base 2 having the shape of a bottomed box, and a cover, not shown, for covering an open upper side of the base 2. A predetermined number of magnetic disks 4 are mounted in layers on a spindle motor, not shown, of in-hub construction so as to be rotatable. The spindle motor is disposed on the side of the base. The magnetic disks 4 are rotated at a predetermined rotating speed by the spindle motor.

An actuator 10 is disposed in the disk pack 3. FIG. 17 is a top view of the magnetic disk 4 and the actuator 10. Referring to FIGS. 16 and 17, the actuator 10 has a head support arm 12 supported by the middle part thereof on a pivot (shaft) 11 for rotation relative to the base 2. A head slider 14 holding a magnetic head 13 for reading recorded data from the magnetic disk 4 and writing data to the magnetic disk 4 is attached to a front end part of the head support arm 12. A voice coil 15 is held on a back end part of the head support arm 12. The voce coil 15 is disposed between a coil holding arms 16a and 16b that extend in a V-shape from a part around the pivot 11 of the head support arm 12 so as to diverge from each other.

A stator 17 is disposed on the base 2. The stator 17 creates a magnetic field in a space between the voice coil 15 held on the back end part of the actuator 10, and the stator 17. Thus, the voice coil 15 and the stator 17 constitute a voice coil motor (VCM) for turning the actuator 10. The VCM drives the actuator 10 for turning on the pivot 11 to move the magnetic head 13 attached to the front end part of the actuator 10 substantially along a radius of the magnetic disk 4 for a seek operation so that the magnetic head 13 can be located opposite to a desired track on the magnetic disk 4.

A ramp 18 is held on the base 2 to hold the head slider 14 holding the magnetic head 13 apart from the magnetic disk 4 while the hard disk drive 1 is not in operation.

An inertial latching mechanism 20 is attached to the base 2. The inertial latching mechanism 20 latches the actuator 10 when an intense shock is applied to the hard disk drive 1 by an inertial force resulting from the shock acting on the hard disk drive 1. FIG. 18 is an enlarged view of the inertial latching mechanism 20 and the associated parts. As shown in FIGS. 17 and 18, the inertial latching mechanism 20 has a latching arm 22 having a middle part supported by a pivot (shaft) 21 on the base 2 (FIG. 16). The latching arm 22 is able to turn on the pivot 21. A projection 23 projects from the front end of the latching arm 22 into the base 2, i.e., into the paper as viewed in FIG. 18. A pin 24 is attached to a back end part of the latching arm 22 so as to extend away from the bottom of the base 2, i.e., out of the paper as viewed in FIG. 18. An inertial arm, not shown, is disposed near the pin 24. The inertial arm is turned by an external shock so as to push the pin 24.

When the hard disk drive 1 is not operating for reading data from or writing data to the magnetic disk 4, the VCM drives the actuator 10 to set the head slider 14 on the ramp 18. If a relatively small shock is applied to the hard disk drive 1 in this state, the ramp 18 restrains the head slider from movement so that the head slider 14 may not move toward the magnetic disk 4. If a relatively large shock is applied to the hard disk drive 1, the inertial arm, not shown, pushes the pin 24 to turn the latching arm 22 in the direction of the arrow $\alpha$. Consequently, the projection 23 is engaged with inner side, near the extremity of the coil holding arm 16a, of a part 161 to latch the actuator 10. The inertial latching mechanism 20 thus restrains the movement of the head slider 14 so that the head slider 14 may not move toward the magnetic disk 4.

In FIGS. 17 and 18, the actuator 10 holding the head slider 14 is restrained from movement by the inertial latching mechanism 20. In the normal state, the latching arm 22 of the inertial latching mechanism 20 is pulled in the direction of the arrow $\beta$ by a spring, not shown, to keep the projection 23 disengaged from the coil holding arm 16a.

SUMMARY OF THE INVENTION

When the hard disk drive 1 operates for reading data from or writing data to the magnetic disk 4, the VCM drives the actuator 10 to place the head slider 14 resting on the ramp 18 on the magnetic disk 4 at a read/write position. When a comparatively high shock acts on the hard disk drive 1 in such an operative state, the projection 23 of the inertial latching mechanism 20 abuts on the coil holding arm 1 6a as shown in FIGS. 19 and 20. Consequently, the actuator 10 is dislocated, the magnetic head 13 is unable to operate normally for a data reading or writing operation, and thereby the performance of the hard disk drive 1 is deteriorated.

Recent hard disk drives 1 are required to have an enhanced shock resistance because hard disk drives 1 are incorporated into potable devices other than personal computers (PCs), such as portable notebook-size personal computers, AV devices and on-vehicle devices in recent years. Recording density in which recent hard disk drives 1 record data has further been increased and the track pitch of magnetic disks 4 has been reduced accordingly. Therefore, the deterioration of the reading and writing performance of the hard disk drive 1 due to the operation of the inertial latching mechanism 20 while the actuator 10 holding the head slider 14 is in an operative state has become not negligible.

The present invention has been made to solve those technical problems and it is therefore an object of the present invention to prevent the deterioration of reading and writing performance due to interference between the latching mechanism and a moving member, such as the actuator, while the head slider is in an operative state.

The present invention solves the aforesaid technical problems by distinguishing a state where the inertial latching mechanism is able to operate, and a state where the inertial latching mechanism is restrained from operation.

According to a first aspect of the present invention, a disk drive comprises: a disk-shaped storage medium supported for rotation; a moving member supporting a read/write head for reading recorded data from the disk-shaped storage medium and writing data to the disk-shaped storage medium, and for moving the read/write head between a read/write position where the head is able to read data from and write data to the disk-shaped storage medium and a home position where the read/write head is separated from the disk-shaped storage medium; a latching mechanism for securely holding the moving member in place; and a switching mechanism for switching the latching mechanism between an operative state and an inoperative state.

In the disk drive according to the first aspect of the present invention, the moving member may be supported for turning on a pivot, and may have one end part supporting a head slider holding the read/write head, and the other end part for being latched by the latching mechanism. The latching mechanism may be an inertial latching mechanism that operates in response to an external shock. The switching mechanism may set the latching mechanism in the operative state when the read/write head is at the home position, and may set the same in the inoperative state when the read/write head is at the read/write position. The latching mechanism may have a latching member that moves in response to an external shock, and the switching mechanism may have a stopper member interlocked with the moving member so as to be engaged with or disengaged from the latching member according to the movement of the moving member.

According to a second aspect of the present invention, a disk drive comprises: a disk-shaped storage medium supported for rotation; a moving member supporting a read/write head for reading recorded data from the disk-shaped storage medium and writing data to the disk-shaped storage medium, and for moving the read/write head between a read/write position where the head is able to read data from and write data to the disk-shaped storage medium and a home position where the read/write head is separated from the disk-shaped storage medium; a latching mechanism for securely holding the moving member in place; and a latch locking mechanism for locking the latching mechanism when the read/write head is at the read/write position.

In the disk drive according to the second aspect of the present invention, the latching mechanism may have a latching member that moves in response to an external impact, and the latch locking mechanism may have a stopper member that restrains the latching member from movement. The stopper member may be interlocked with the moving member so as to move according to the movement of the moving member. The disk drive may further comprise a biasing member for biasing the stopper member so as to obstruct the operation of the latching mechanism. The obstruction of operation of the latching mechanism may be removed when the moving member pushes the stopper member. The disk drive may further comprise a biasing member for biasing the stopper member to advance the stopper member into a moving range for the latching mechanism. The stopper member may be pushed by the moving member so as to move out of a moving range for the latching mechanism.

According to a third aspect of the present invention, a disk drive comprises: a disk-shaped storage medium supported for rotation; a moving member supporting a read/write head for reading recorded data from the disk-shaped storage medium and writing data to the disk-shaped storage medium, and for moving the read/write head between a read/write position where the read/write head is able to read data from and write data to the disk-shaped storage medium and a home position where the read/write head is separated from the disk-shaped storage medium; and a latching mechanism for securely holding the moving member in place when the read/write head is at the home position and of remaining separate from the moving member when the read/write head is at the read/write position; wherein the latching mechanism includes a latching member for latching the moving member when the read/write head is at the home position, and a stopper member for restraining the latching member from movement when the read/write head is at the read/write position.

In the disk drive according to the third aspect of the present invention, the stopper member may be interlocked with the moving member, may release the latching member when the read/write head is at the home position, and may restrain the latching member when the read/write head is at the read/write position. The stopper member may have a first contact part for being engaged with and disengaged from the moving member, a second contact part for being engaged with and disengaged from the latching member, and a support part movably supporting the first and the second contact part. The stopper member may separate from the latching member when the same is pushed by the moving member, and may remain in contact with the latching member when the same is not pushed by the moving member.

BRIEF DESCRIPTION OF THE DRAWINGS

FIGS. 5(a) and 5(b) are a top view and a perspective view, respectively, of a stopper arm.

FIG. 8 is a view of assistance in explaining a conventional hard disk drive in an inoperative state.

DETAILED DESCRIPTION OF THE INVENTION

Preferred embodiments of the present invention will be described with reference to the accompanying drawings.

Figure 1:
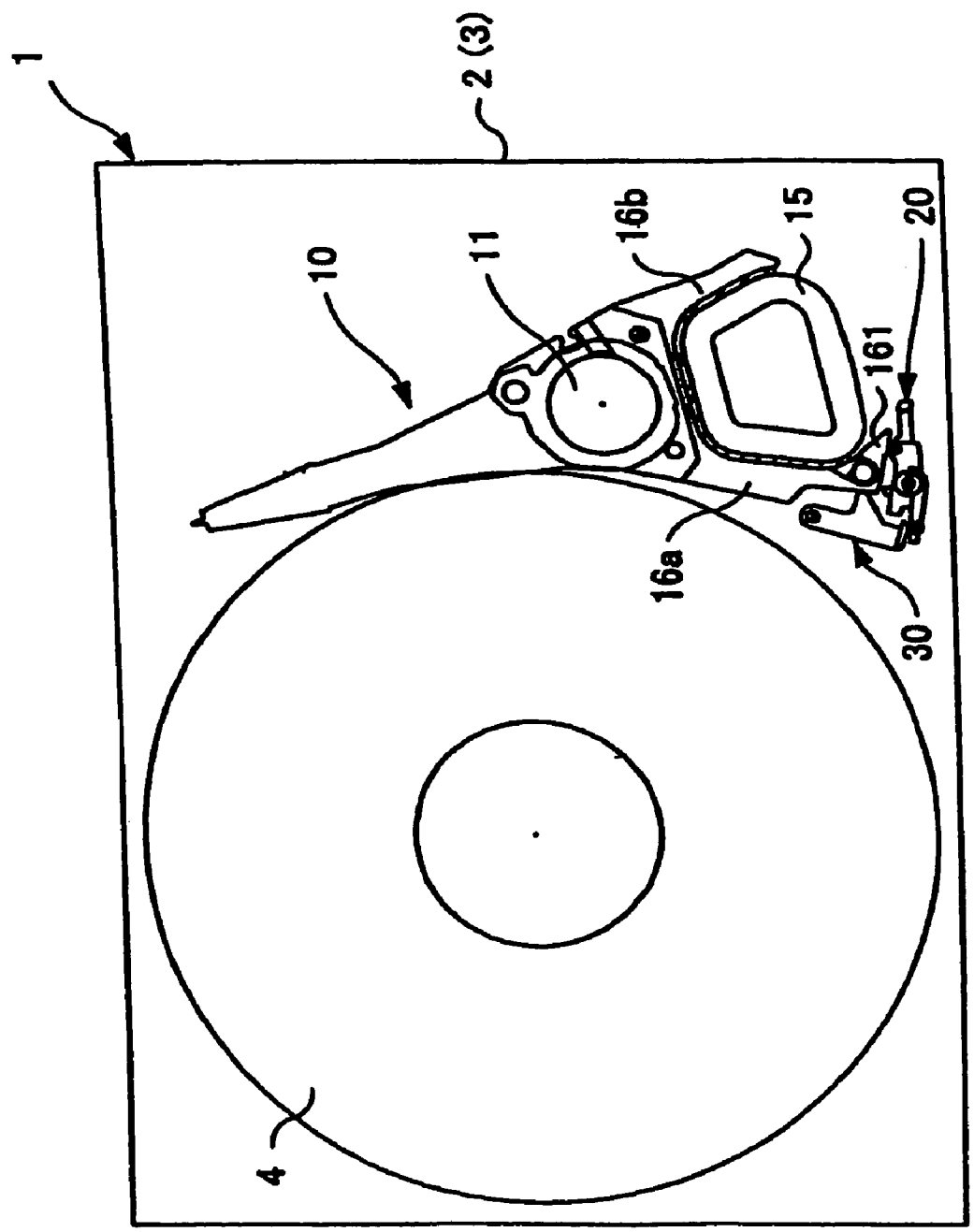
FIG. 1 is a view of assistance in explaining a hard disk drive in a first embodiment according to the present invention in an inoperative state.
Figure 8:
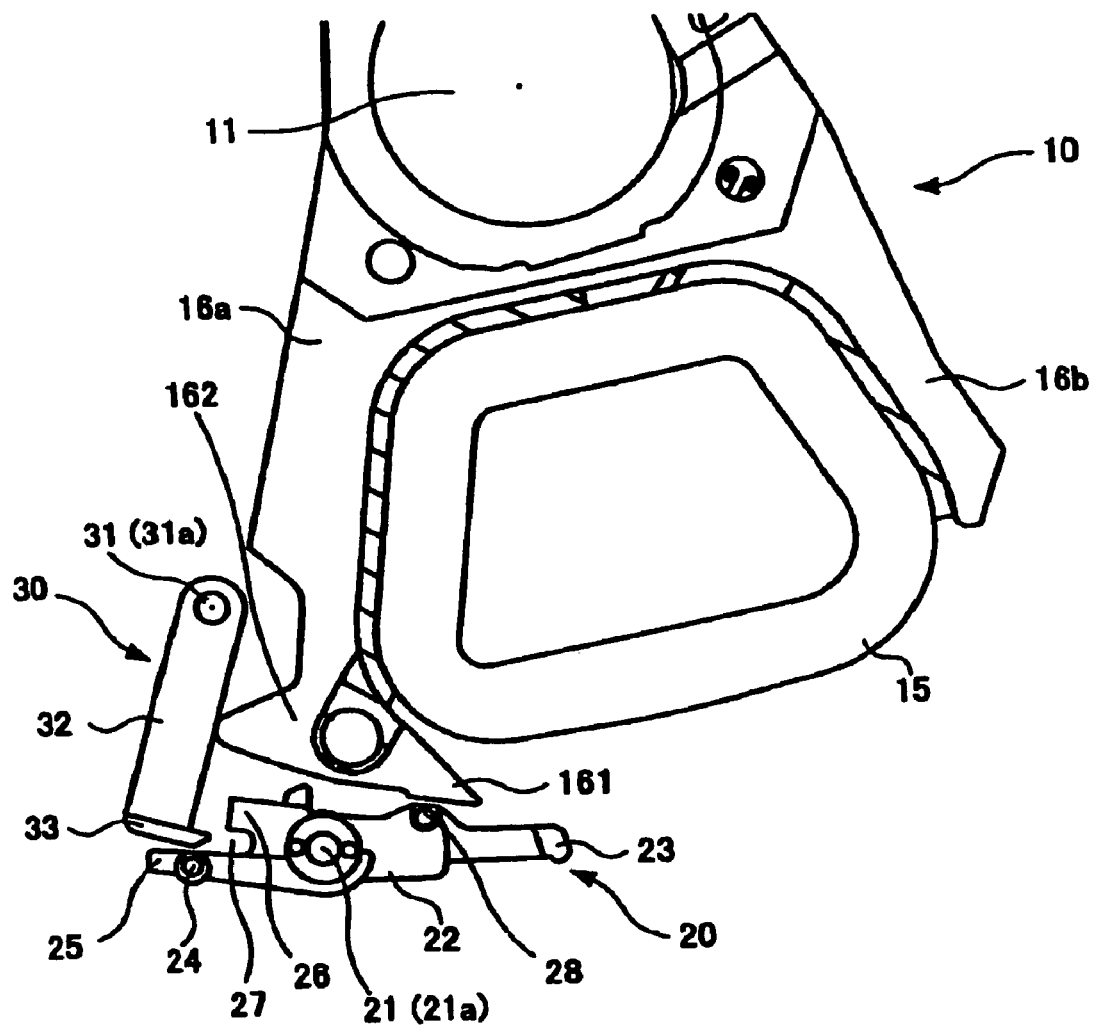
FIG. 8 is a view of assistance in explaining a modification of the first embodiment.
Figure 16:
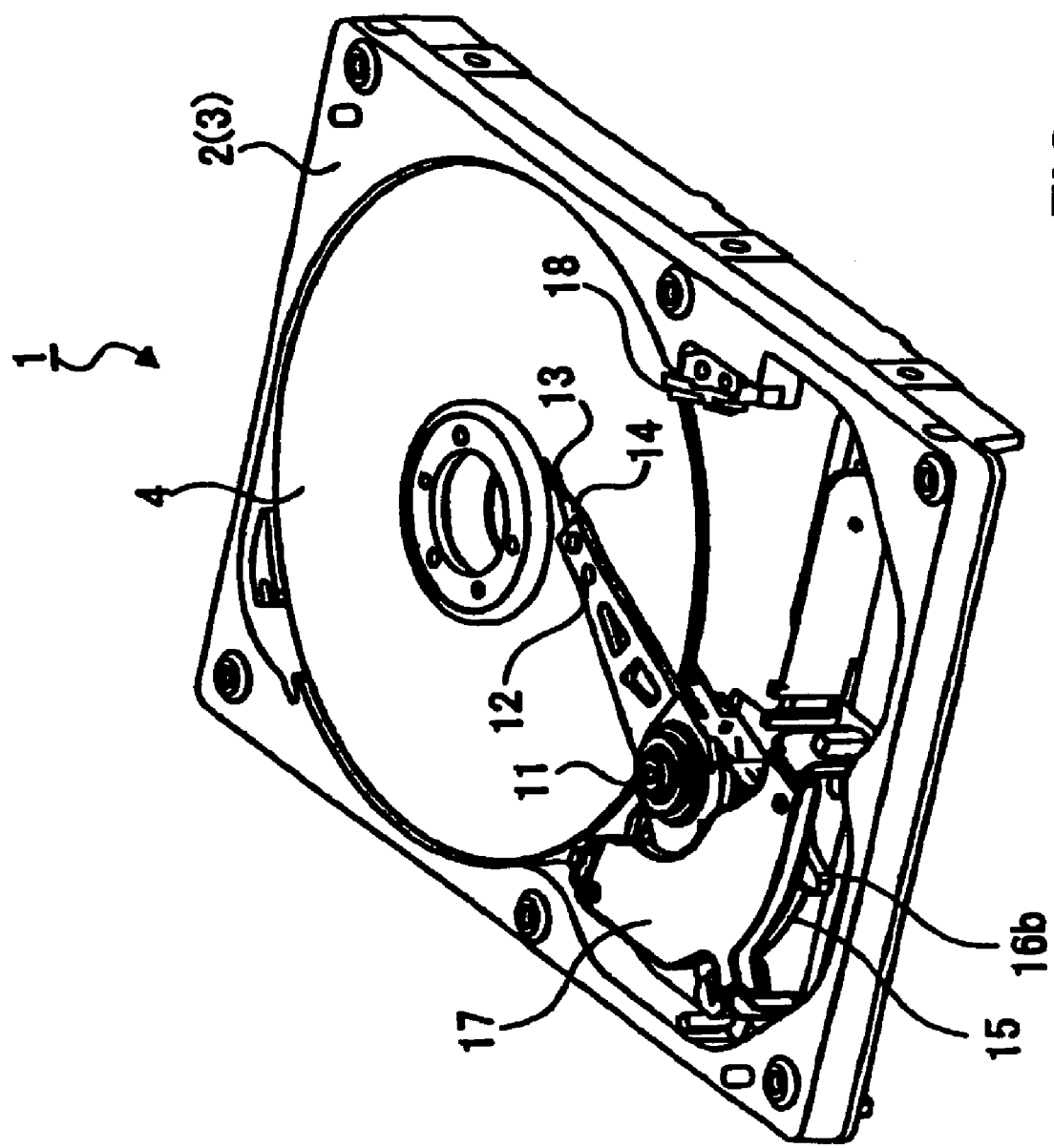
FIG. 16 is a view of a hard disk drive.
Figure 17:
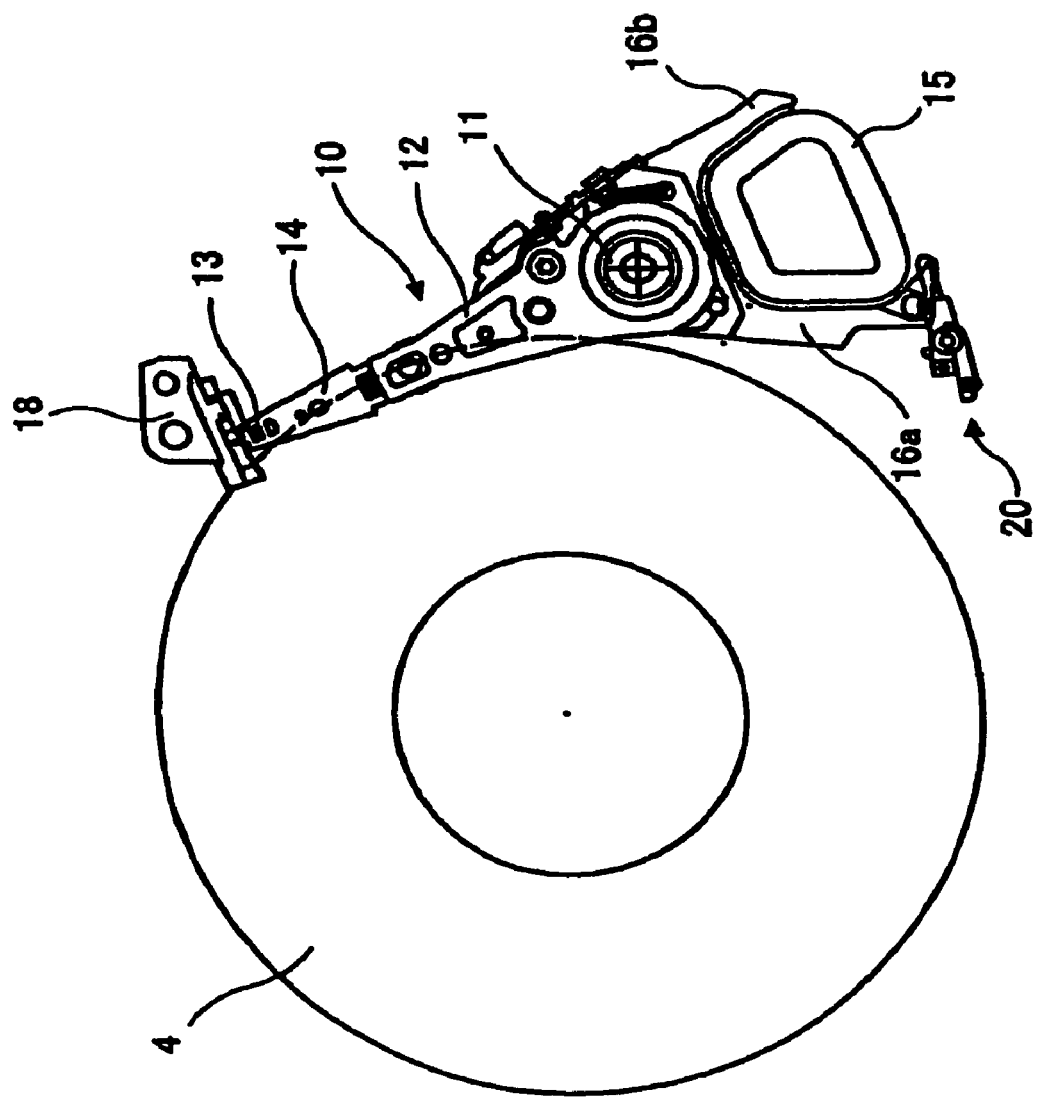
FIG. 17 is a view of assistance in explaining a conventional hard disk drive in an inoperative state.
Figure 18:
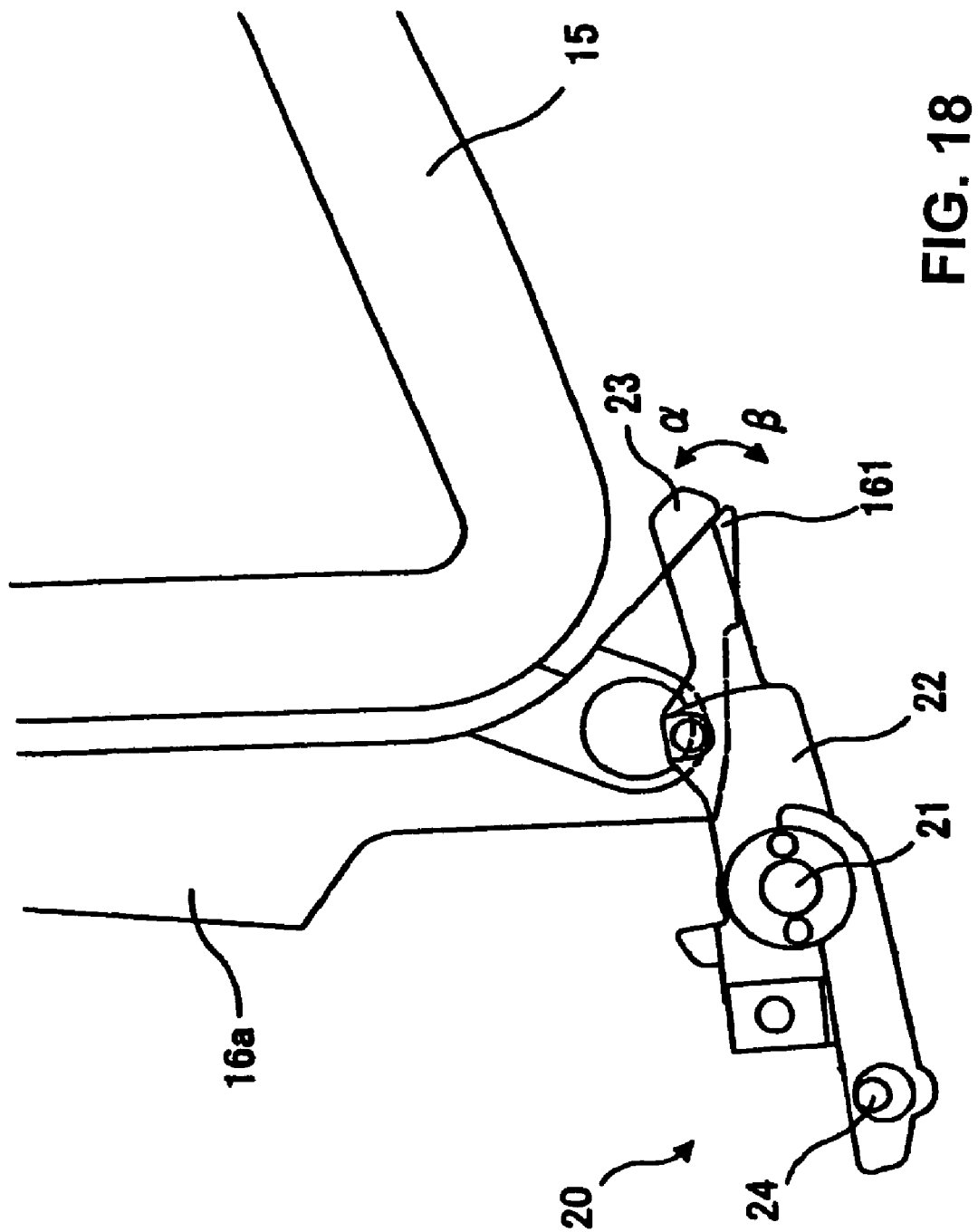
FIG. 18 is a view of assistance in explaining the operation of a conventional inertial latching mechanism in an inoperative state.
Figure 19:
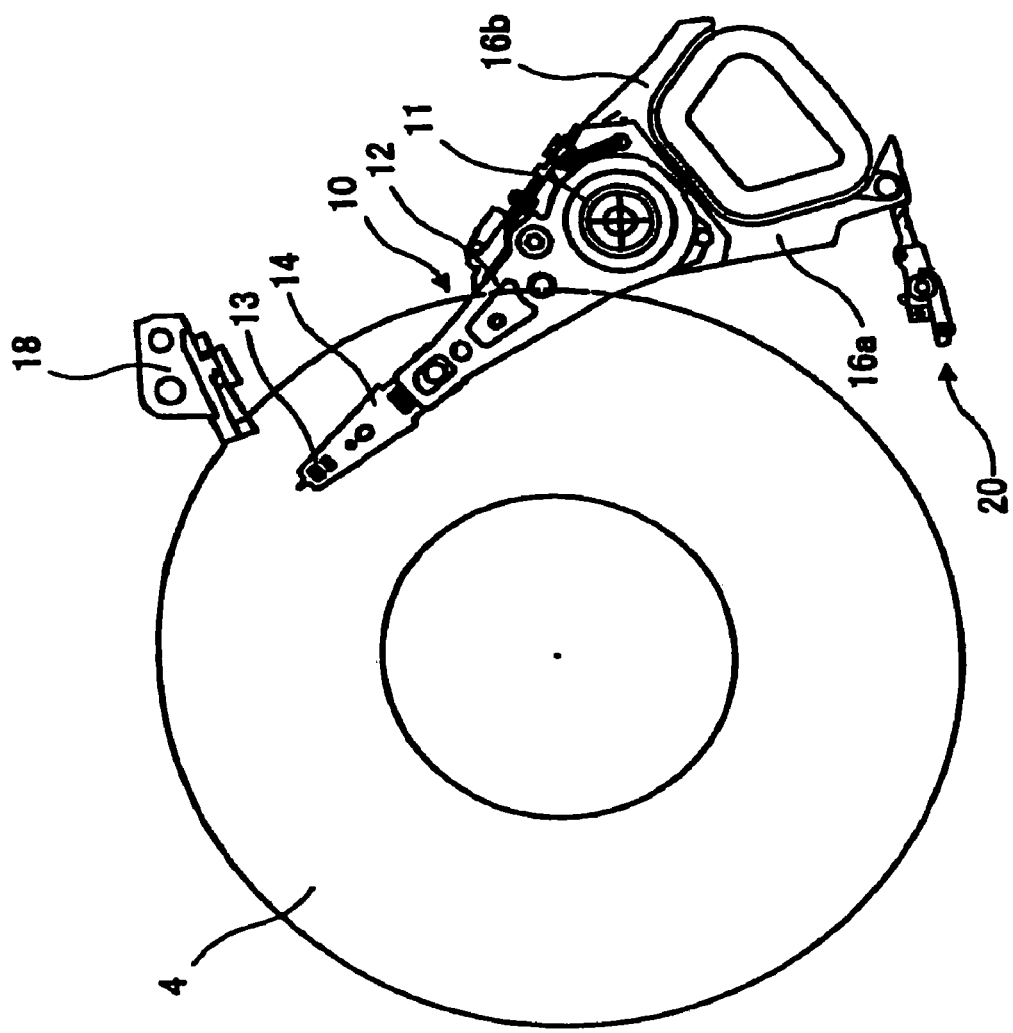
FIG. 19 is a top view of the conventional hard disk drive in an operative state.
Figure 20:
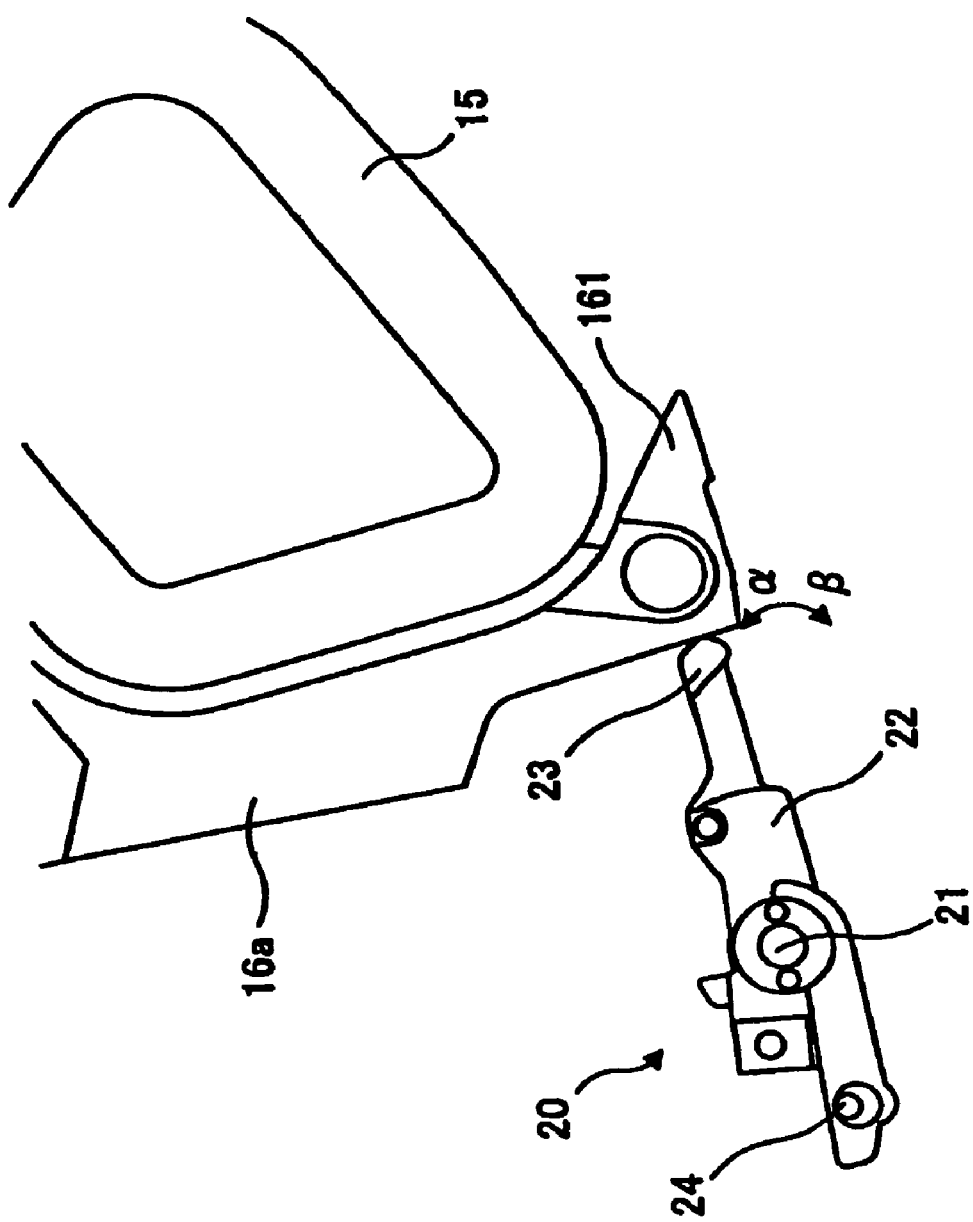
FIG. 20 is a view of assistance in explaining a conventional inertial latching mechanism in an operative state.

First Embodiment. Hard disk drives embodying the present invention are the same in basic construction as the conventional hard disk drive shown in FIG. 16 and hence the description of the basic construction of the hard disk drives embodying the present invention will be omitted. FIG. 1 is a top view of a magnetic disk 4 and an actuator 10 (moving member) included in a hard disk drive in a preferred embodiment according to the present invention. The actuator 10 is substantially the same in basic construction as the conventional actuator 10 shown in FIG. 17 and hence the parts thereof corresponding to those shown in FIG. 8 are denoted by the same reference characters and the description thereof will be omitted.

The hard disk drive 1 in this embodiment includes the actuator 10, an inertial latching mechanism 20, and a latch stopper (switching mechanism, latch locking mechanism) 30, disposed in a base 2. The latch stopper 30 interlocked with the actuator 10 controls the operation of the inertial latching mechanism 20 in a state where the actuator 10 is located at a read/write position.

Figure 2:
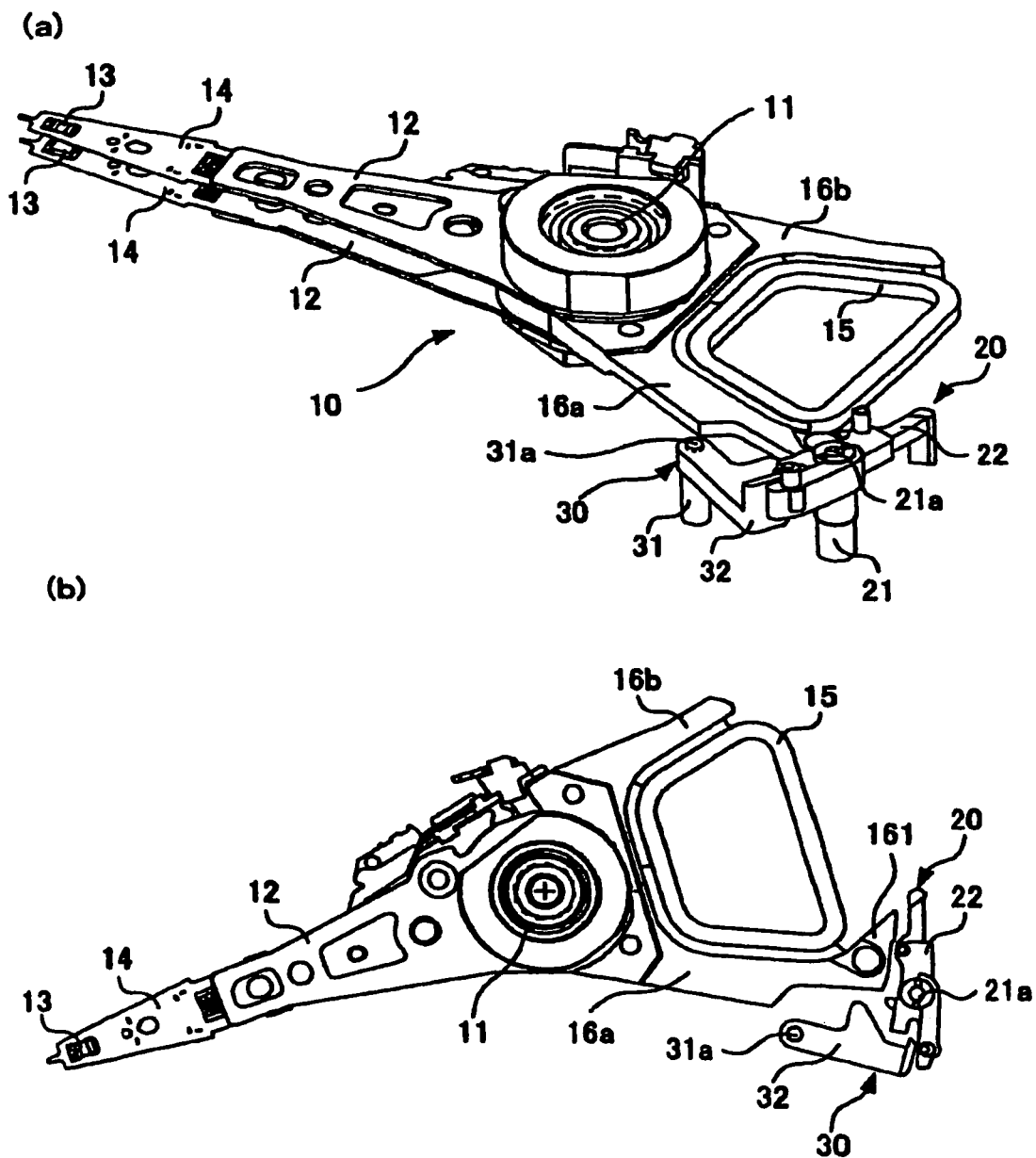
FIGS. 2(a) and 2(b) are a perspective view and a top view, respectively, of an actuator, an inertial latching mechanism and a latch stopper.
Figure 3:
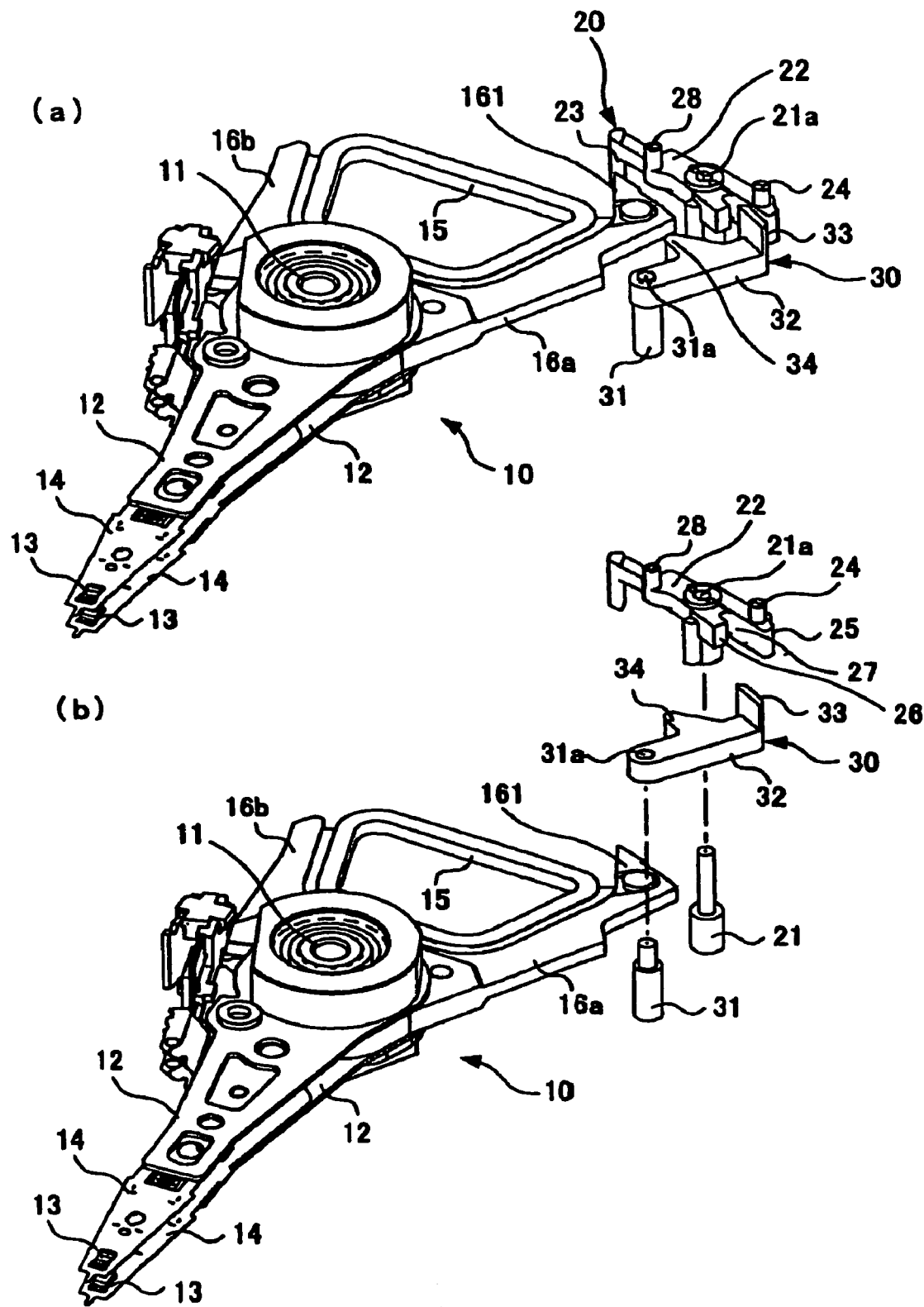
FIGS. 3(a) and 3(b) are a perspective view and an exploded perspective view, respectively, of the actuator, the inertial latching mechanism and the latch stopper.

FIGS. 2(a) and 2(b) are a perspective view and a top view, respectively, of the actuator 10, the inertial latching mechanism 20 and the latch stopper 30. FIG. 3(a) is another perspective view of the actuator 10, the inertial latching mechanism 20 and the latch stopper 30. FIG. 3(b) is an exploded perspective view of the inertial latching mechanism 20 and the latch stopper 30.

The inertial latch 20 has a pivot (shaft) 21 set upright on the base 2 (FIG. 1), and a latching arm (latching member) 22 provided with a through hole 21a. The pivot 21 is fitted in the through hole 21a to support the latching arm 22 for turning. The latch stopper 30 has a pivot 31 set upright on the base 2 (FIG. 1), and a stopper arm (stopper member) 32 provided with a through hole 31a. The pivot 31 is fitted in the through hole 31a to support the stopper arm 32 for turning. The hard disk drive in this embodiment is provided with two magnetic heads 13 for reading data from and writing data to the opposite surfaces of a magnetic disk 4 (FIG. 1), two head sliders 14 holding the two magnetic heads 13, respectively, and two head arms 12 supporting the two head sliders 14, respectively.

Figure 4:
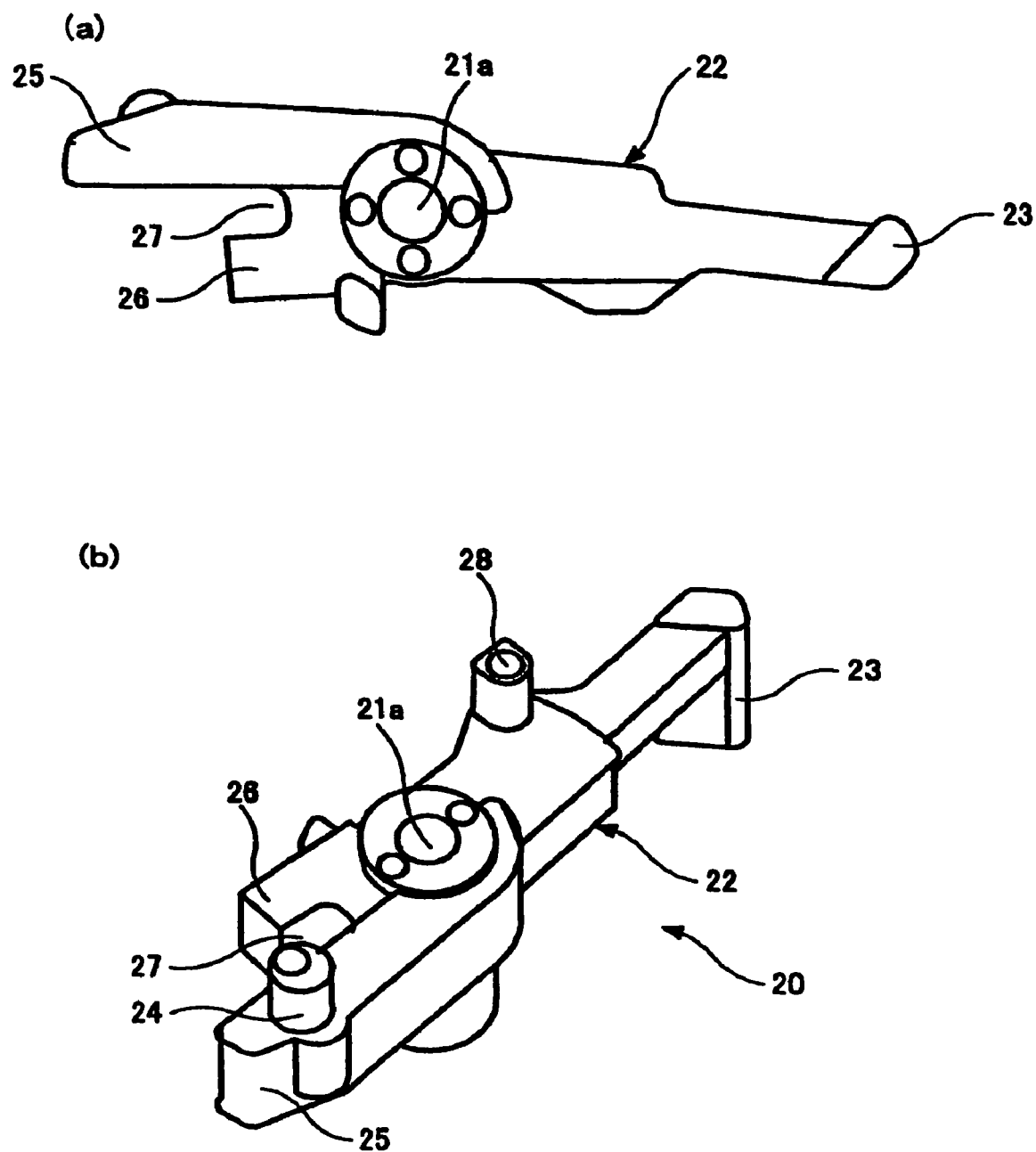
FIGS. 4(a) and 4(b) are a bottom view and a perspective view, respectively, of a latching arm.
Figure 6:
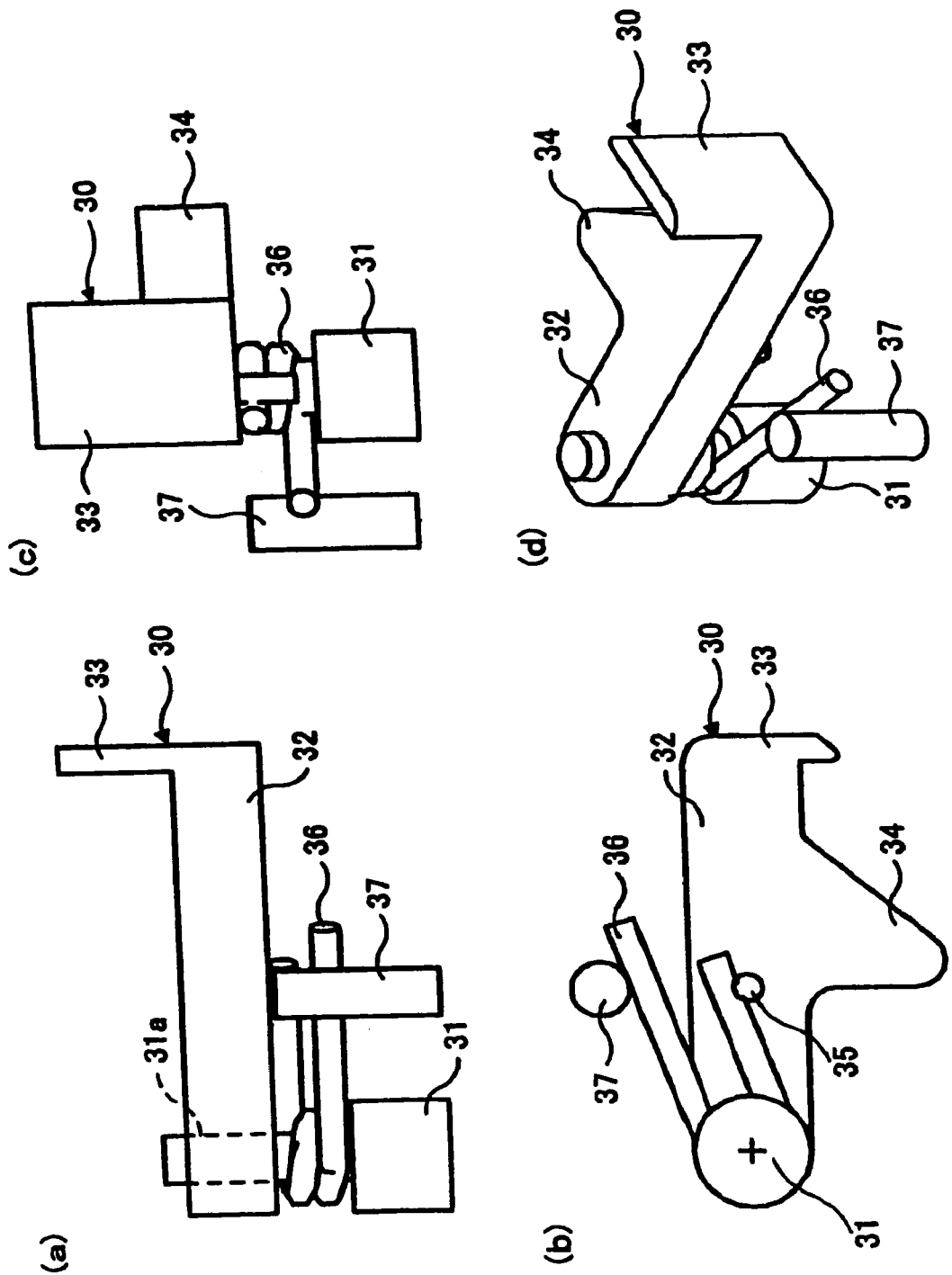
FIGS. 6(a), 6(b), 6(c) and 6(d) are a front elevation, a bottom view, a side elevation and a perspective view, respectively, of a latch stopper.

FIGS. 4(a) and 4(b) are a bottom view, and a perspective view, respectively, of the latching arm 22. Preferably, the latching arm 22 is formed of a nonmagnetic material, such as a plastic resin.

The through hole 21a is formed in a substantially middle part of the latching arm 22. The latching arm 22 has a first part extending on one side of the through hole 21a provided with a projection 23 projecting downward (toward the base 2), and a second part extending on the other side of the through hole 21a. The second part of the latching arm 22 has a first longitudinal arm 25 and a second longitudinal arm 26 parallel to the first arm 25. A groove 27 is formed between the first arm 25 and the second arm 26. A pin 24 is set upright on the upper surface of the first arm 25. A pin 28 is set upright in a part, between the projection 23 and the through hole 21a, of the latching arm 22. An inertial arm, not shown, is disposed between the pins 24 and 28. The inertial arm is turned by an external shock so as to push either the pin 24 or the pin 28.

FIGS. 5(a) and 5(b) are a top view and a perspective view, respectively, of the stopper arm 32. Preferably, the stopper arm 32 is formed of a nonmagnetic material, such as a plastic resin.

The through hole 31a (support part) of the stopper arm 32 is formed in one end part of the stopper arm 32, and a flat projection (second contact part) 33 projects toward the latching arm 22 from the upper surface of the other end part of the stopper arm 32. The stopper arm 32 is provided in its middle part with a cam 34 (first contact part) protruding to a coil holding arm 16a. A pin 35 projects downward (toward the base 2) from the lower surface of a substantially middle part of the stopper arm 32.

FIGS. 6(a), 6(b), 6(c) and 6(d) are a front elevation, a bottom view, a side elevation and a perspective view, respectively, of the latch stopper 30.

The latch stopper 30 has a torsion coil spring (biasing member) 36 wound round the pivot 31. A spring stopper 37 is set upright on the base 2 (FIG. 1) at a position near the pivot 31. The torsion coil spring 36 has opposite arms held between the spring stopper 37 and the pin 35 attached to the stopper arm 32. Thus, the torsion coil spring 36 pushes the stopper arm 32 toward the actuator 10 facing the cam 34.

Operations of the actuator 10, the inertial latching mechanism 20 and the latch stopper 30 will be described with reference to FIGS. 1 to 7.

When the hard disk drive 1 in this embodiment is in an inoperative state and is not in a read/write operation, a VCM 10 drives the actuator 10 so as to set the head slider 14 on a ramp 18. In this state, the stopper arm 32 of the latch stopper 30 is turned against the resilience of the torsion coil spring 36, the cam 34 of the stopper arm 32 is pressed against a side surface of the coil holding arm 16a of the actuator 10, and the stopper arm 32 is separated from the latching arm 22 of the inertial latching mechanism 20 (FIG. 1).

If a relatively small shock acts on the hard disk drive 1 in this state, the ramp 18 restrains the head slider 14 from movement and prevents the head slider 14 from moving toward the magnetic disk 4. If a relatively large shock acts on the hard disk drive 1, the inertial arm, not shown, is moved by the shock and pushes the pin 24. Consequently, the latching arm 22 is turned toward the actuator 10, the projection 23 is engaged with the inner side of a part 161 of the coil holding arm 16a to retain the actuator 10 at a home position. In this state, the head slider 14 remains held on the ramp 18. Thus, the coil holding arm 16a serves as a lever for controlling the movement of the actuator 10.

Figure 7:
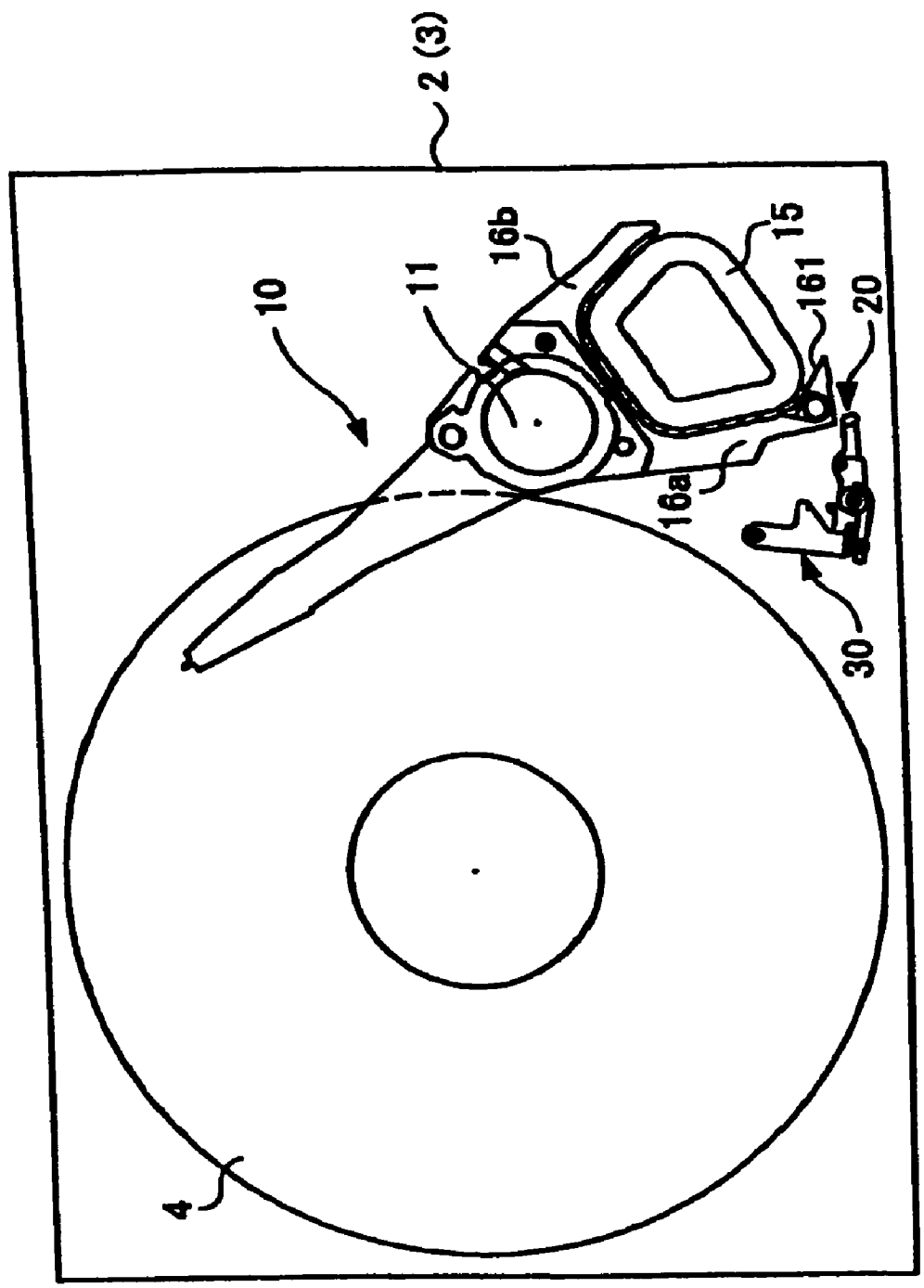
FIG. 7 is a view of assistance in explaining the hard disk drive in the first embodiment in an inoperative state.

When the hard disk drive 1 in this embodiment performs a read/write operation (operative state), the VCM drives the actuator 10 to shift the head slider 14 from the ramp 18 to a desired position on the magnetic disk 4. In this state, the cam 34 is separated from the side surface of the coil holding arm 16a of the actuator 10, and the stopper arm 32 of the latch stopper 30 is not pushed. The torsion coil spring 36 turns the stopper arm 32 to bring the stopper arm 32 into engagement with the latching arm 22 of the inertial latching mechanism 20 (FIG. 7). More concretely, the projection 33 of the stopper arm 32 of the latch stopper 30 is fitted in the groove 27 of the latching arm 22 of the inertial latching mechanism 20 to restrain the latching arm 22 from turning.

If a relatively large shock acts on the hard disk drive 1 in this state, the actuator 10 does not come into contact with the latching arm 22, the latching arm 22 does not exert any force on the actuator 10, and hence the operation of the magnetic head 13 held by the head slider 14 is not obstructed because the latching arm 22 is unable to turn.

Thus, the deterioration of the data read/write performance of the hard disk drive can be prevented even if a shock that is for causing the inertial latching mechanism 20 to function acts on the hard disk drive 1 while the head slider 14 is located on the magnetic disk 4. If an shock that is for causing the inertial latching mechanism 20 to function acts on the hard disk drive 1 with the head slider 14 moved away from the magnetic disk 4, the stopper arm 32 of the latch stopper 30 is disengaged form the latching arm 22 of the inertial latching mechanism 20, and the latching arm 22 is able to turn to latch the actuator 10.

Since the latch stopper 30 is mechanically interlocked with the actuator 10 and the inertial latching mechanism 20, the hard disk drive in this embodiment can easily be formed.

Although the stopper arm 32 of the latch stopper 30 is provided with the cam 34, the stopper arm 32 does not necessarily need to be provided with the cam 34; For example, the coil holding arm 16a of the actuator 10 may be provided with a cam 162 protruding toward the stopper arm 32 as shown in FIG. 8.

Figure 9:
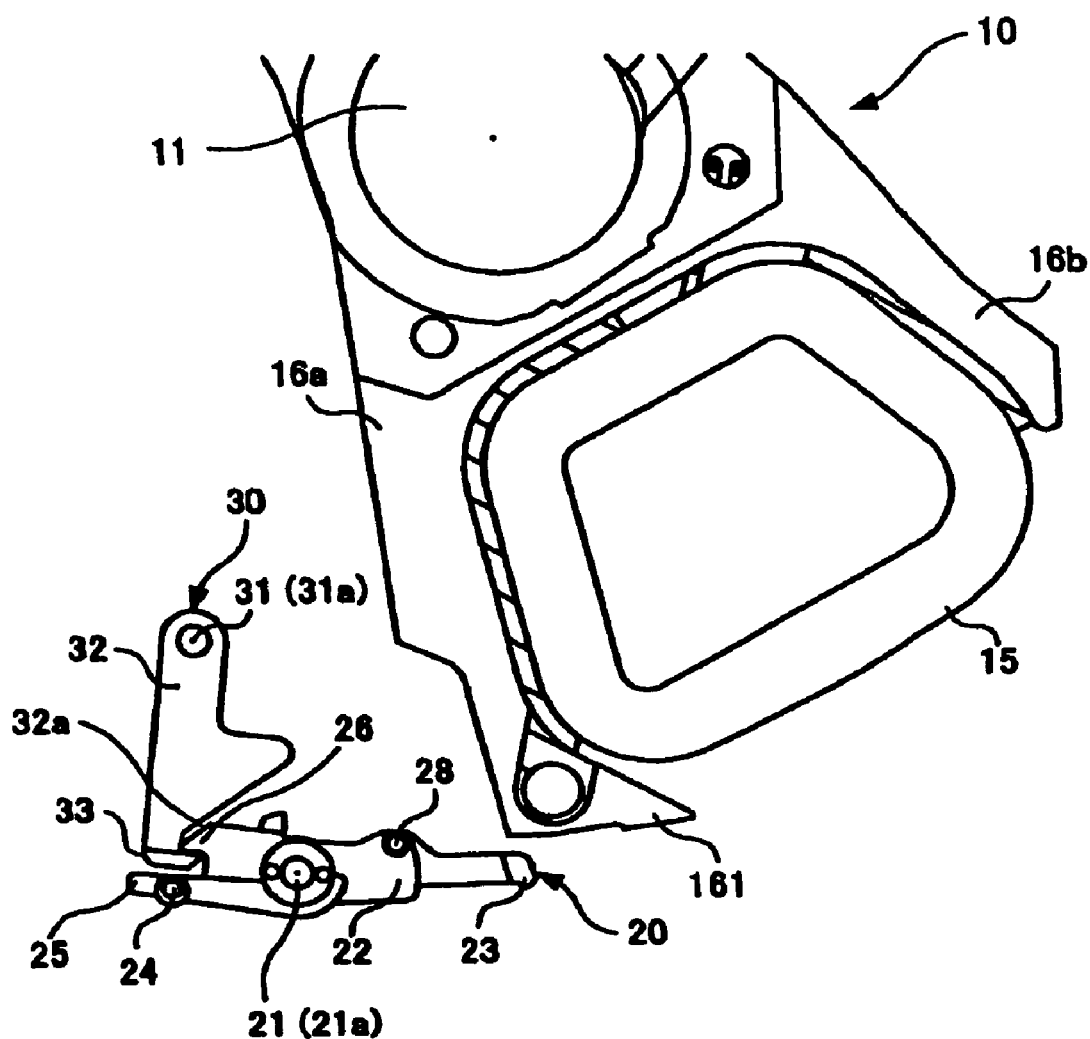
FIG. 9 is a view of assistance in explaining another modification of the first embodiment.
Figure 10:
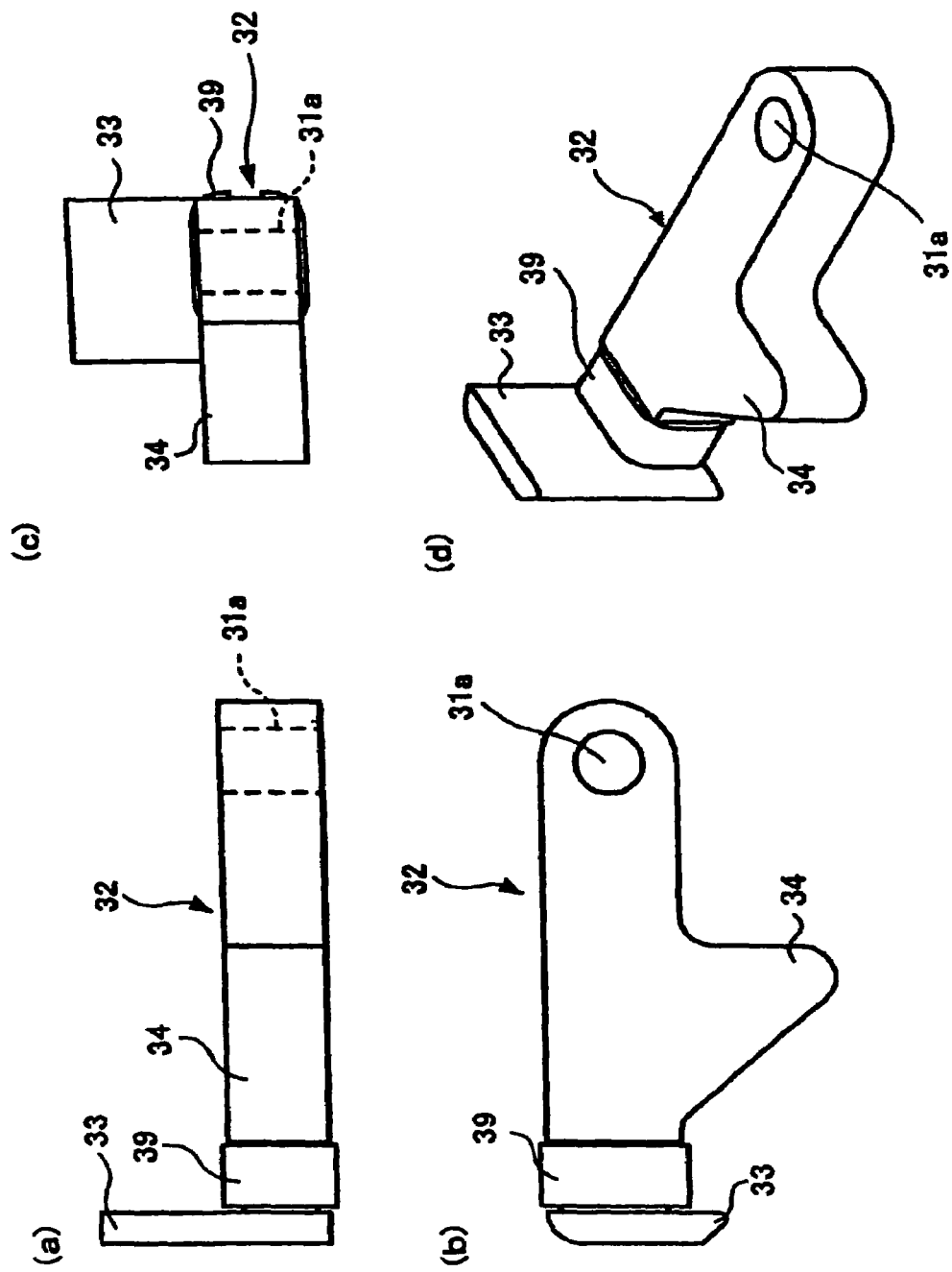
FIGS. 10(a), 10(b), 10(c) and 10(d) are a front elevation, a bottom view, a side elevation and a perspective view, respectively, of a stopper arm employed in a hard disk drive in a second embodiment according to the present invention.

The latching arm 22 of the inertial latching mechanism 20 does not necessarily need to be provided with the groove 27. For example, the stopper arm 32 of the latch stopper 30 may be provided with a recess 32a, and the second arm 26 of the latching arm 22 of the inertial latching mechanism 20 may be engaged in the recess 32a as shown in FIG. 9 to restrain the latching arm 22 from turning and to release the latching arm 22.

Second Embodiment. A hard disk drive 1 in a second embodiment is substantially the same in construction as the hard disk drive 1 in the first embodiment, except that the hard disk drive 1 in the second embodiment uses magnetic force instead of the resilience of a spring for biasing a stopper arm 32 of a latch stopper 30. In the following description, parts like or corresponding to those of the first embodiment are denoted by the same reference characters and the description thereof will be omitted.

FIGS. 10(a), 10(b), 10(c) and 10(d) are a front elevation, a bottom view, a side elevation and a perspective view, respectively, of the stopper arm 32.

The stopper arm 32 of the latch stopper 30 of the hard disk drive 1 in the second embodiment is provided with a projection 33 at one end thereof, and a cam 34 in a middle part thereof. An iron band 38 is wound round a part, near the projection 33, of the stopper arm 32. The latch stopper 30 of the second embodiment is not provided with any member corresponding to the torsion coil spring 36 and hence is not provided with any member corresponding to the pin 35.

Operations of an actuator 10, an inertial latching mechanism 20 and the latch stopper 30 will be described with reference to FIGS. 1, 4, 7 and 10.

When the hard disk drive 1 in this embodiment is in an inoperative state and is not in a read/write operation, a VCM 10 drives the actuator 10 so as to set a head slider 14 on a ramp 18. In this state, the cam 34 of the stopper arm 32 is pressed by a side surface of the coil holding arm 16a of the actuator 10, and the stopper arm 32 is separated from the latching arm 22 of the inertial latching mechanism 20 (FIG. 1).

When the hard disk drive 1 in this embodiment performs a read/write operation (operative state), the VCM drives the actuator 10 to shift the head slider 14 from the ramp 18 to a desired position on the magnetic disk 4. In this state, the cam 34 is separated from the side surface of the coil holding arm 16a of the actuator 10, and the stopper arm 32 of the latch stopper 30 is not pushed. When a current is supplied to the voice coil 15 of the actuator 10, the iron band 38 is attracted toward the actuator 10 by leakage magnetic flux generated by the VCM and, consequently, the stopper arm 32 is engaged with the latching arm 22 of the inertial latching mechanism 20 as shown in FIG. 7. More specifically, the projection 33 of the stopper arm 32 of the latch stopper 30 engages in the recess 27 of the latching arm 22 of the inertial latching mechanism 20 to restrain the latching arm 22 from turning. In the second embodiment, the VCM serves as a biasing member for biasing the stopper arm 32.

Thus, the deterioration of the data read/write performance of the hard disk drive 1 can be prevented even if a shock that is capable of causing the inertial latching mechanism 20 to function acts on the hard disk drive 1 while the head slider 14 is located on the magnetic disk 4. If a shock that is capable of causing the inertial latching mechanism 20 to function acts on the hard disk drive 1 with the head slider 14 moved away from the magnetic disk 4, the stopper arm 32 of the latch stopper 30 is disengaged from the latching arm 22 of the inertial latching mechanism 20, and the latching arm 22 is able to turn to latch the actuator 10 as usual.

A bar-shaped or rectangular magnetic member may be combined with the stopper arm 32 by any suitable method instead of winding the iron band 38 round the stopper arm 32. A bar-shaped or rectangular magnetic member may be embedded in, attached to or joined by staking to the stopper arm 32.

Third Embodiment. A hard disk drive in a third embodiment according to the present invention is substantially similar to the hard disk drive in the first embodiment, except that the former is provided with a latching arm 22 included in an inertial latching mechanism 20, and a stopper arm 32 included in a latch stopper 30 different from those of the latter. Parts of the hard disk drive in the third embodiment like or corresponding to those of the first embodiment are denoted by the same reference characters and the description thereof will be omitted.

Figure 11:
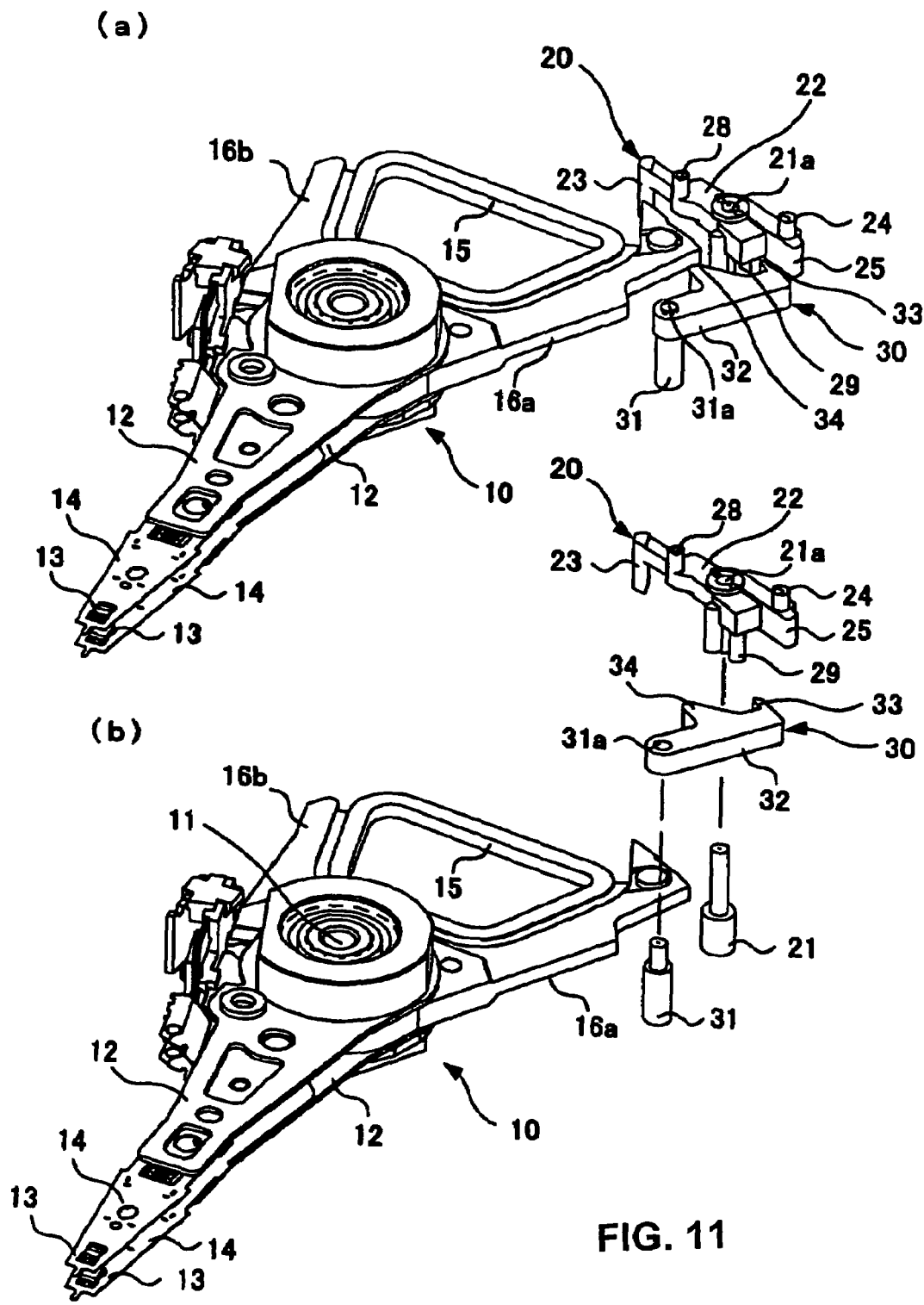
FIGS. 11(a) and 11(b) are a perspective view and an exploded perspective view, respectively, of essential parts of an actuator, an inertial latching mechanism and a latch stopper included in a hard disk drive in a third embodiment according to the present invention.
Figure 12:
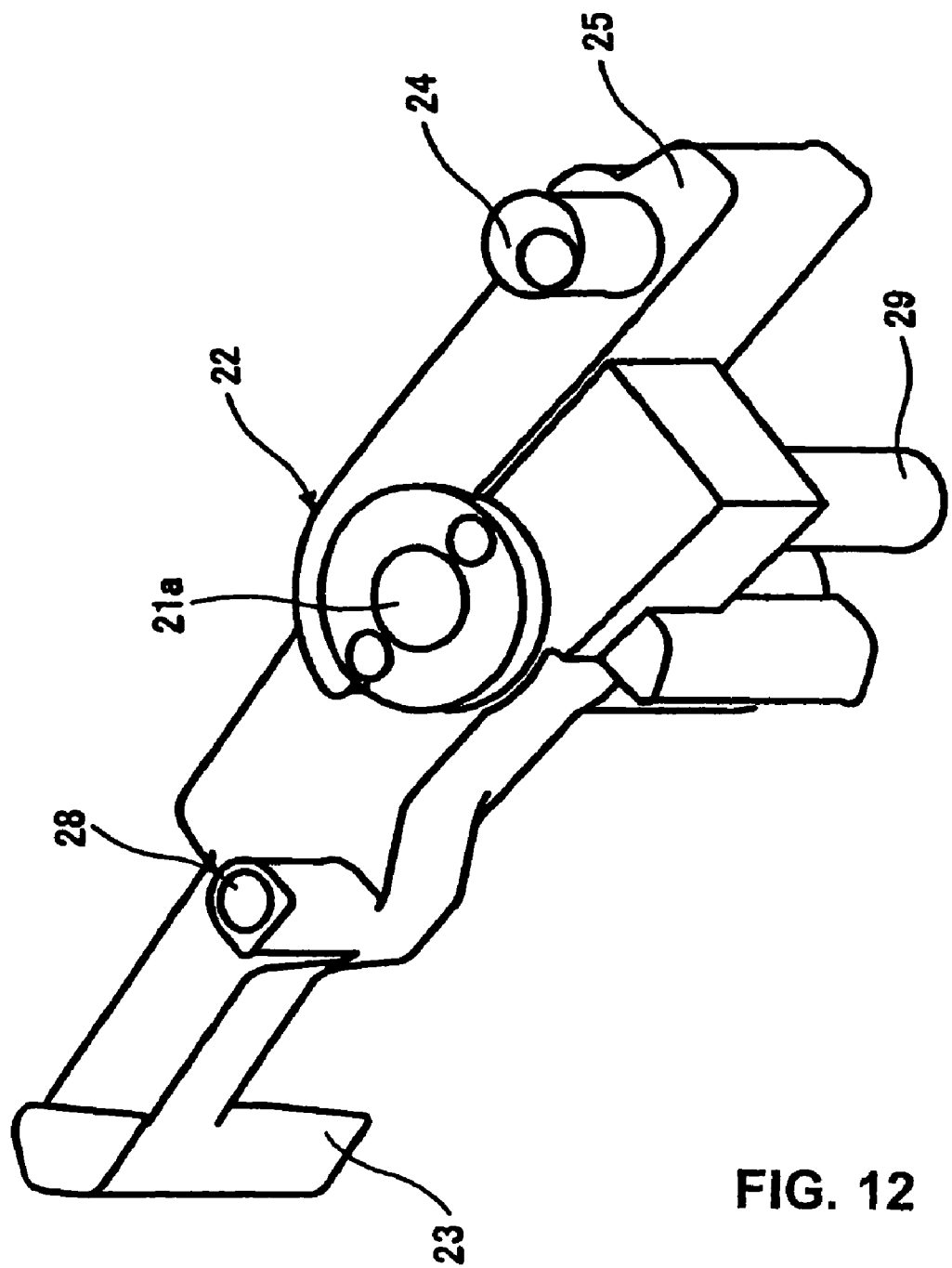
FIG. 12 is a perspective view of a latching arm.
Figure 13:
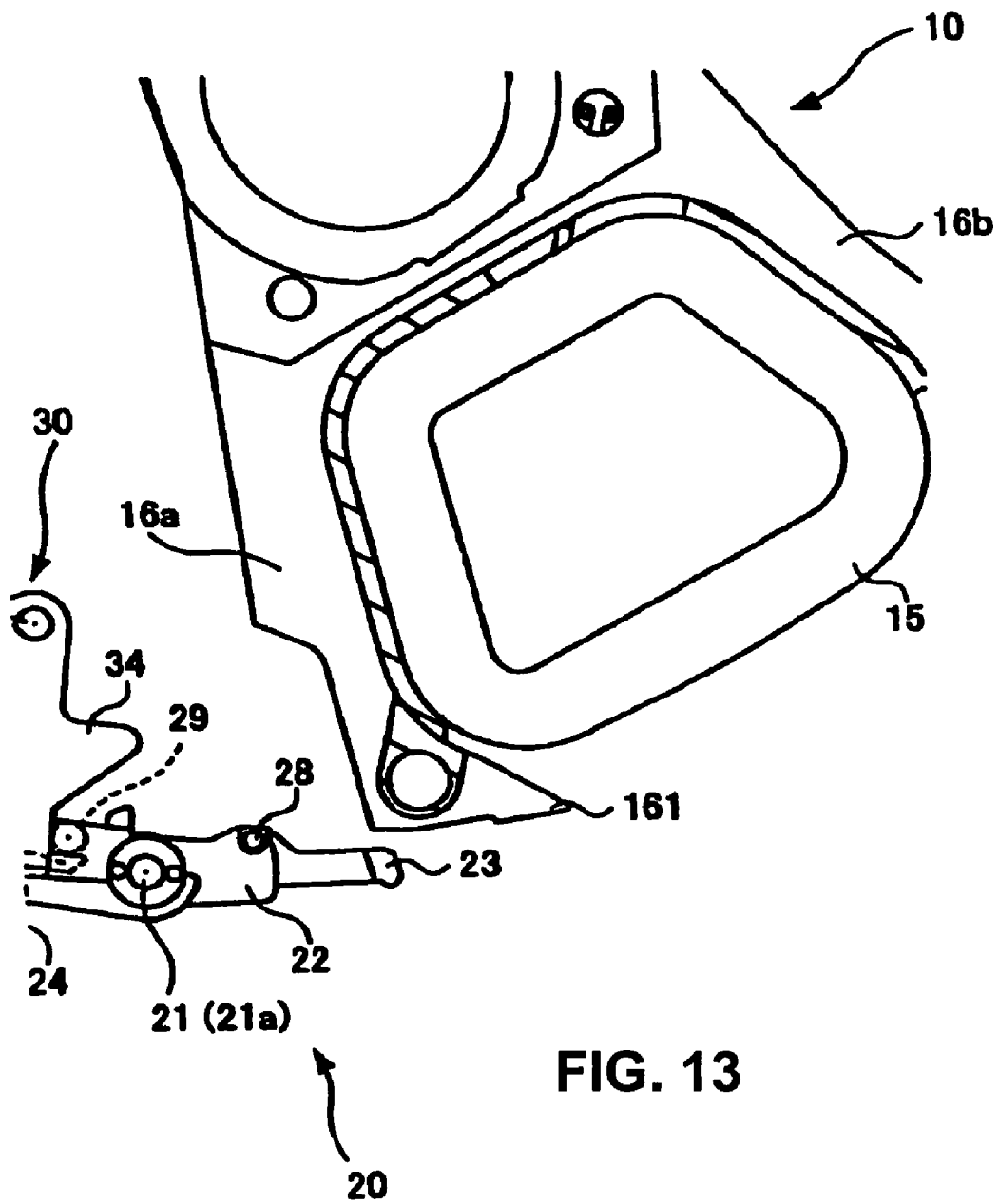
FIG. 13 is a view of assistance in explaining a latch stopper included in a hard disk drive in the third embodiment.

FIGS. 11(a) and 11(b) are a perspective view and an exploded perspective view, respectively, of essential parts of an actuator 10, an inertial latching mechanism 20 and a latch stopper 30 included in a hard disk drive in the third embodiment. FIG. 12 is a perspective view of a latching arm 22 included in the inertial latching mechanism 20.

In the third embodiment, the latching arm 22 is provided with a pin 29 projecting downward from a part thereof near a pin 24. The stopper arm 32 is provided with a projection 33 projecting toward the latching arm 22.

In this embodiment, when a head slider 14 is moved to a home position, a side surface of the coil holding arm 16a of an actuator 10 is pressed, similarly to that of the first embodiment, against a cam 34 formed in the stopper arm 32 of the latch stopper 30 to turn the stopper arm 32 against the resilience of a torsion coil spring 36 and thereby the stopper am 32 is separated from the latching arm 22 of the inertial latching mechanism 20. When the head slider 14 is moved to a read/write position, the coil holding arm 16a of the actuator 10 is separated from the cam 34 of the stopper arm 32 of the latch stopper 30. Consequently, the stopper arm 32 is turned by the resilience of the torsion coil spring 36 and brought into engagement with the latching arm 22 of the inertial latching mechanism 20. More concretely, the projection 33 of the stopper arm 32 of the latch stopper 30 is engaged with the pin 29 of the latching arm 22 of the inertial latching mechanism 20 to restrain the latching arm 22 from turning.

The third embodiment, similarly to the first embodiment, is capable of preventing the deterioration of data read/write performance even if a shock capable of actuating the inertial latching mechanism 20 is applied to the hard disk drive with the head slider 14 located at a read/write position. If a shock capable of actuating the inertial latching mechanism 20 is applied to the hard disk drive with the head slider 14 held at the home position, the stopper arm 32 of the latch stopper 30 is disengaged from the latching arm 22 of the inertial latching mechanism 20, and the latching arm 22 latches the actuator 10 as usual.

Figure 14:
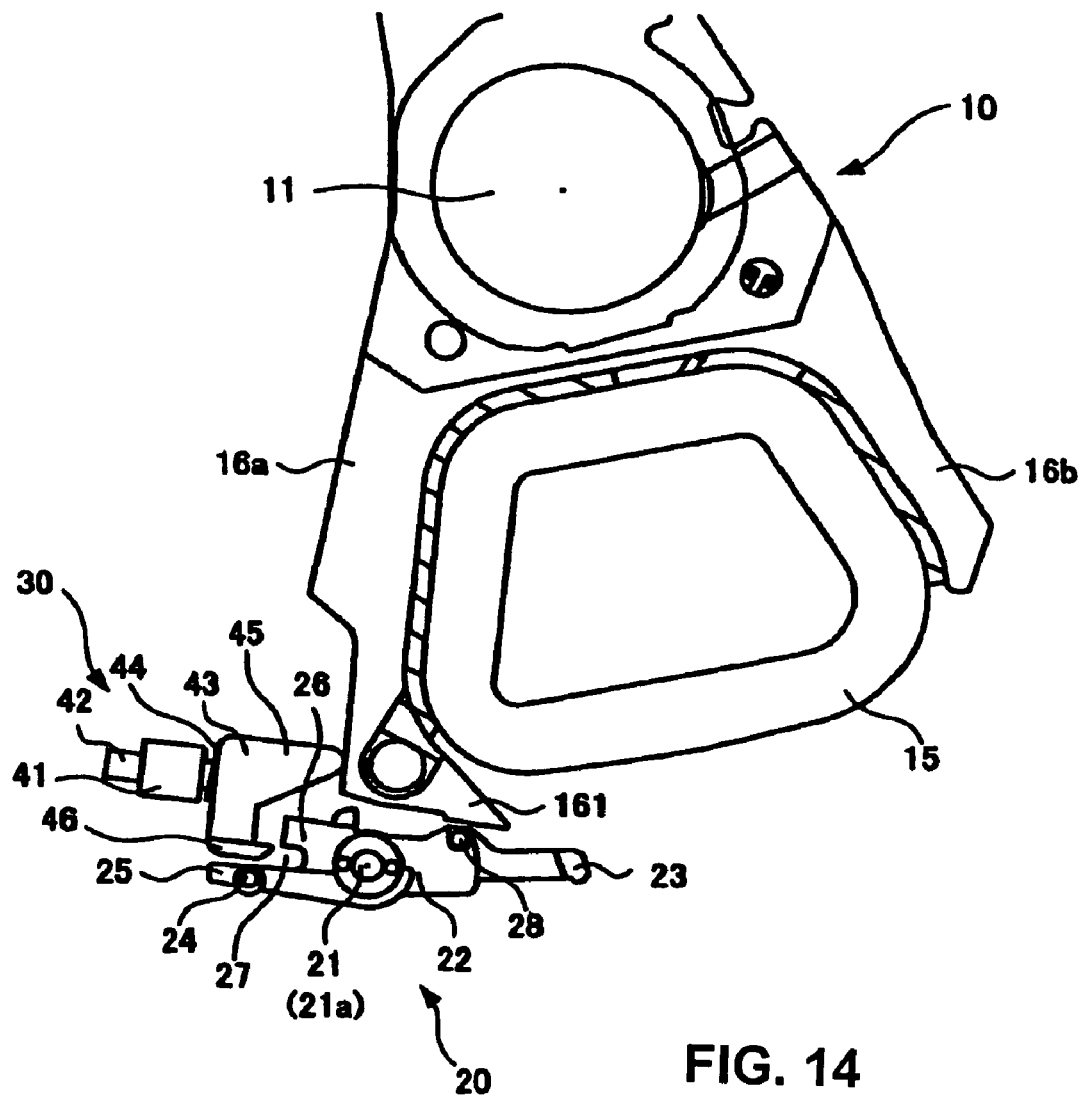
FIG. 14 is a view of assistance in explaining the positional relation between an actuator, an inertial latching mechanism and a latch stopper included in a hard disk drive in a fourth embodiment according to the present invention in an inoperative state.
Figure 15:
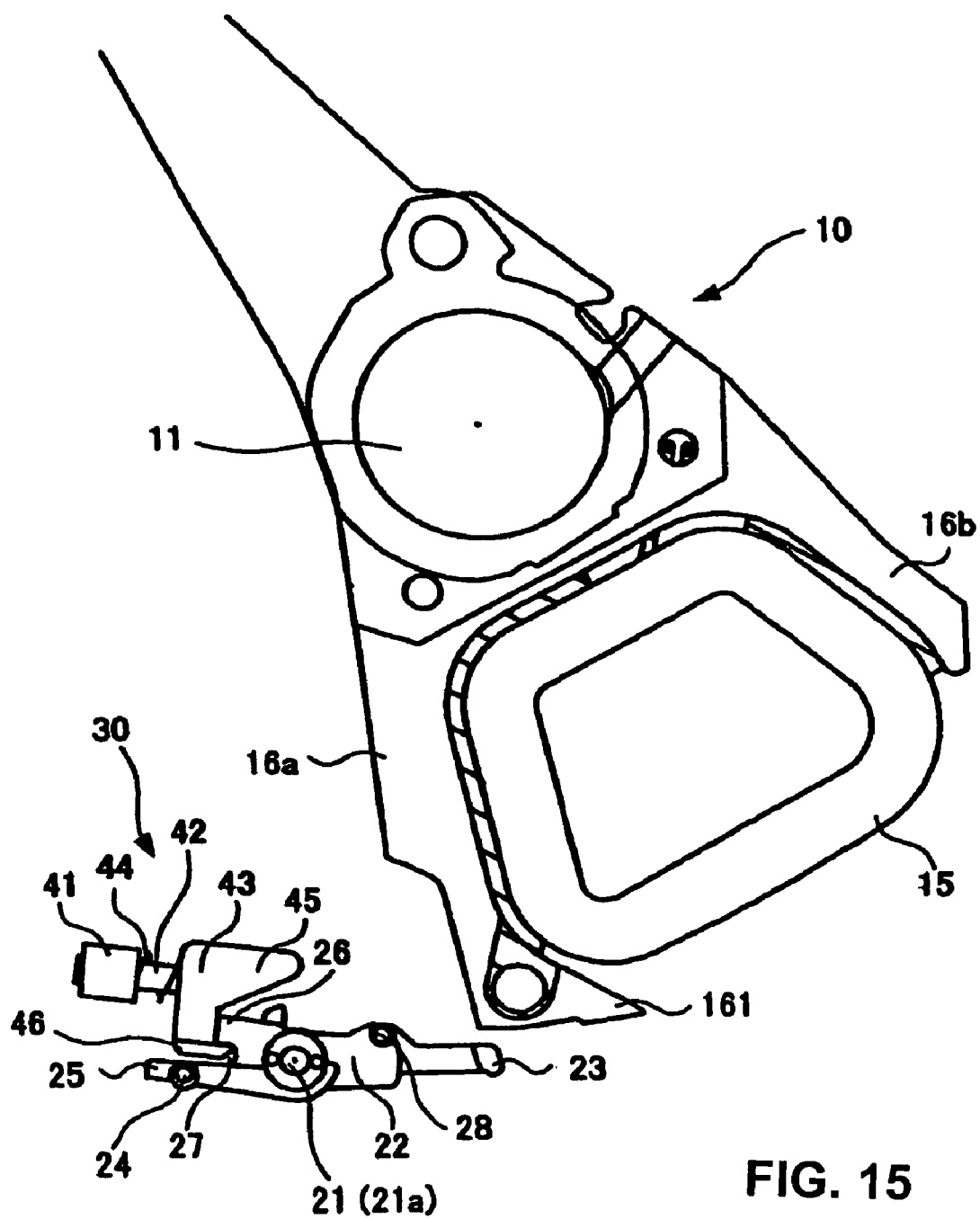
FIG. 15 is a view of assistance in explaining the positional relation between the actuator, the inertial latching mechanism and the latch stopper included in the hard disk drive in the fourth embodiment in an operative state.

Fourth Embodiment. A hard disk drive in a fourth embodiment according to the present invention is substantially similar to the hard disk drive in the first embodiment, except that the former is provided with latch stopper 30 including a stopper slide 43 as shown in FIGS. 14 and 15 instead of the latch stopper 30 including the stopper arm of the first embodiment. Parts of the hard disk drive in the fourth embodiment like or corresponding to those of the first embodiment are denoted by the same reference characters and the description thereof will be omitted.

The latch stopper 30 included in the hard disk drive in the fourth embodiment comprises a hollow cylinder (support member) 41 attached to a base 2, an shaft 42 axially slidably fitted in the cylinder 41, a stopper slide (stopper member) 43 attached to one end, on the side of an actuator 10, of the shaft 42, and a compression coil spring (biasing member) 44 wound round a part, between the cylinder 41 and the stopper slide 43, of the shaft 42. The stopper slide 43 is provided with a cam (first contact part) 45 protruding toward a coil holding arm 16a, and a projection (second contact part) 46 formed at the extremity of an arm extending toward a latching arm 22. The compression coil spring 44 pushes the stopper slide 43 toward the actuator 10.

When a head slider 14 is set at a home position, the side surface of the coil holding arm 16a of the actuator 10 pushes the stopper slide 43 of the latch stopper 30 against the resilience of the compression coil spring 44 to separate the stopper slide 43 from the latching arm 22 of an inertial latching mechanism 20 as shown in FIG. 14. When the head slider 14 is set at a read/write position, the side surface of the coil holding arm 16a of the actuator 10 is separated from the cam 45 of the stopper slide 43 of the latch stopper 30. Then, the stopper slide 43 is advanced by the resilience of the compression coil spring 44 and is engaged with the latching arm 22 of the inertial latching mechanism 20. More concretely, the projection 46 of the stopper slide 43 of the latch stopper 30 is engaged in a groove 27 formed in the latching arm 22 of the inertial latching mechanism to restrain the latching arm 22 from turning.

The fourth embodiment, similarly to the first embodiment, is capable of preventing the deterioration of data read/write performance even if a shock capable of actuating the inertial latching mechanism 20 is applied to the hard disk drive with the head slider 14 located at a read/write position. If a shock capable of actuating the inertial latching mechanism 20 is applied to the hard disk drive with the head slider 14 held at the home position, the stopper slide 43 of the latch stopper 30 is disengaged from the latching arm 22 of the inertial latching mechanism 20, and the latching arm 22 latches the actuator 10.

As apparent from the foregoing description, according to the present invention, the deterioration of the read/write performance due to the interference of the latching mechanism with the actuator can be prevented in a state where the head slider holding the head is set in a read/write state.

What is claimed is:

1. A disk drive, comprising:
a disk-shaped storage medium supported for rotation;
a moving member supporting a read/write head for reading recorded data from the disk-shaped storage medium and writing data to the disk-shaped storage medium, and for moving the read/write head between a read/write position where the head is able to read data from and write data to the disk-shaped storage medium and a home position where the read/write head is separated from the disk-shaped storage medium;
a latching mechanism having a first end for securely holding the moving member in place, and a second end having a pair of arms and a groove formed between the pair of arms; and
a switching mechanism for switching the latching mechanism between an operative state and an inoperative state, the switching mechanism having a flat projection that locates in the groove to engage and retain the latching mechanism in the inoperative state.

2. The disk drive of claim 1, wherein the moving member is supported for turning on a pivot, and has one end part supporting a head slider holding the read/write head, and another end part for being latched by first end of the latching mechanism.

3. The disk drive of claim 1, wherein the latching mechanism is an inertial latching mechanism that operates in response to an external shock, and wherein the switching mechanism comprises a support member attached to a base, a shaft axially slidable relative to the support member, a stopper member attached to the shaft adjacent the moving member, a biasing member on the shaft between the support member and the stopper member.

4. The disk drive of claim 1, wherein the switching mechanism sets the latching mechanism in the operative state when the read/write head is at the home position, and sets the latching mechanism in the inoperative state when the read/write head is at the read/write position, and wherein an iron element is secured to the switching mechanism adjacent the flat projection, the iron element being magnetically attracted to the moving member for moving the switching mechanism.

5. The disk drive of claim 1, wherein the latching mechanism has a latching member that moves in response to an external shock; and the switching mechanism has a stopper member interlocked with the moving member so as to be engaged with or disengaged from the latching member according to the movement of the moving member.

6. A disk drive, comprising:

a disk-shaped storage medium supported for rotation;

a moving member supporting a read/write head for reading recorded data from the disk-shaped storage medium and writing data to the disk-shaped storage medium, and for moving the read/write head between a read/write position where the read/write head is able to read data from and write data to the disk-shaped storage medium and a home position where the read/write head is separated from the disk-shaped storage medium;

a latching mechanism for securely holding the moving member in place; and a latch locking mechanism for locking the latching mechanism when the read/write head is at the read/write position, the latch locking mechanism having an iron element secured thereto for magnetically attracting and moving the latch locking mechanism toward a magnet on the moving member.

7. The disk drive of claim 6, wherein the latching mechanism has a latching member that moves in response to an external shock, and a pair of arms and a groove formed between the pair of arms; and the latch locking mechanism has a stopper member that restrains the latching member from movement, the stopper member comprising a flat projection that locates in the groove to engage and retain the latching mechanism in an inoperative state.

8. The disk drive of claim 6, further comprising a biasing member for biasing the stopper member so as to obstruct the operation of the latching mechanism, the biasing member comprising a support member attached to a base, a shaft axially slidable relative to the support member, a stopper member attached to the shaft adjacent the moving member, a biasing member on the shaft between the support member and the stopper member.

9. The disk drive of claim 8, wherein the obstruction of operation of the latching mechanism is removed when the moving member pushes the biasing member.

10. The disk drive of claim 7, further comprising a biasing member for biasing the stopper member to advance the stopper member into a moving range for the latching mechanism, and wherein the latching mechanism has an axial post for engagement by the latch locking mechanism for retaining the latching mechanism in an inoperative state.

11. The disk drive of claim 7, wherein the stopper member is pushed by the moving member so as to move out of a moving range for the latching mechanism.

12. A disk drive, comprising:

a disk-shaped storage medium supported for rotation;

a moving member supporting a read/write head for reading recorded data from the disk-shaped storage medium and writing data to the disk-shaped storage medium, and for moving the read/write head between a read/write position where the read/write head is able to read data from and write data to the disk-shaped storage medium and a home position where the read/write head is separated from the disk-shaped storage medium; and a latching mechanism for securely holding the moving member in place when the read/write head is at the home position and of remaining separate from the moving member when the read/write head is at the read/write position; and wherein the latching mechanism includes a latching member for latching the moving member when the read/write head is at the home position, and a stopper member for restraining the latching member from movement when the read/write head is at the read/write position the stopper member comprising a support member attached to a base, a shaft axially slidable relative to the support member, a stopper attached to the shaft adjacent the moving member, and a biasing member on the shaft between the support member and the stopper for biasing the stopper toward the moving member.

13. The disk drive of claim 12, wherein the stopper member is interlocked with the moving member, releases the latching member when the read/write head is at the home position, and restrains the latching member when the read/write head is at the read/write position, and the stopper member has an iron element secured thereto for magnetically attracting and moving the stopper toward a magnet on the moving member.

14. The disk drive of claim 12, wherein the stopper member has a first contact part for being engaged with and disengaged from the moving member, a second contact part for being engaged with and disengaged from the latching member, and a support part movably supporting the first and the second contact part, the second contact part comprising a flat projection that locates in a groove in the latching member to engage and retain the latching mechanism in an inoperative state.

15. The disk drive of claim 14, wherein the stopper member separates from the latching member when pushed by the moving member, and the stopper member remains in contact with the latching member when not pushed by the moving member, and wherein the latching mechanism has an axial post for engagement by the stopper member for retaining the latching mechanism in an inoperative state.

* * * * *

UNITED STATES PATENT AND TRADEMARK OFFICE
CERTIFICATE OF CORRECTION

PATENT NO.       : 7,242,555 B2                                    Page 1 of 1
APPLICATION NO.  : 10/721621
DATED            : July 10, 2007
INVENTOR(S)      : Naoaki Kanada et al.

It is certified that error appears in the above-identified patent and that said Letters Patent is hereby corrected as shown below:

Correction to Inventor Name (75): Delete "Yuhhi" and replace with --Yuhki--

Signed and Sealed this

Twenty-eighth Day of August, 2007

JON W. DUDAS
*Director of the United States Patent and Trademark Office*